US 10,786,910 B2

United States Patent
Asada et al.

(10) Patent No.: US 10,786,910 B2
(45) Date of Patent: Sep. 29, 2020

(54) EXTENDING ROBOTIC ARM

(71) Applicant: Massachusetts Institute of Technology, Cambridge, MA (US)

(72) Inventors: Haruhiko Harry Asada, Lincoln, MA (US); Abbas Munir Shikari, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/107,088

(22) Filed: Aug. 21, 2018

(65) Prior Publication Data
US 2019/0054637 A1  Feb. 21, 2019

Related U.S. Application Data

(60) Provisional application No. 62/548,065, filed on Aug. 21, 2017.

(51) Int. Cl.
| | |
|---|---|
| *B25J 17/00* | (2006.01) |
| *B25J 17/02* | (2006.01) |
| *B25J 18/00* | (2006.01) |
| *B25J 18/02* | (2006.01) |
| *F16H 21/54* | (2006.01) |
| *B25J 9/06* | (2006.01) |
| *B25J 13/08* | (2006.01) |

(52) U.S. Cl.
CPC ............. *B25J 18/025* (2013.01); *B25J 9/065* (2013.01); *B25J 13/089* (2013.01); *B25J 18/02* (2013.01); *F16H 21/54* (2013.01)

(58) Field of Classification Search
CPC ..... B25J 18/06; B25J 9/06; B25J 9/065; B25J 13/089
See application file for complete search history.

(56) References Cited

U.S. PATENT DOCUMENTS

| | | | | |
|---|---|---|---|---|
| 4,489,826 A | * | 12/1984 | Dubson ..................... | B25J 9/06 198/812 |
| 4,712,969 A | * | 12/1987 | Kimura ..................... | B25J 9/06 148/402 |
| 4,800,723 A | * | 1/1989 | Clot .......................... | B25J 3/04 60/390 |

(Continued)

OTHER PUBLICATIONS

Gonzalez et al., Triple scissor extender: A 6-DOF lifting and positioning robot. 2016 IEEE Intl Conf on Robotics and Automation (ICRA). Stockholm, Sweden May 16-21, 2016. Published Jun. 2016;2016:847-53.

(Continued)

*Primary Examiner* — Jake Cook
(74) *Attorney, Agent, or Firm* — Wolf, Greenfield & Sacks, P.C.

(57) ABSTRACT

Expandable robotic arms are described. A robotic arm may include a series of expandable segments connected to each other. Further, each of the expandable segments may be individually controlled to expand and/or tilt with one or two tilt degrees of freedom. In operation, the robotic arm may expand sequentially segment by segment from a proximal most segment to a distal most segment to reach a target position and orientation from an initial position and orientation. A variety of methods and algorithms for pathfinding and otherwise operating such a robotic arm are also described.

19 Claims, 16 Drawing Sheets

(56) References Cited

U.S. PATENT DOCUMENTS

| | | | | |
|---|---|---|---|---|
| 5,727,391 | A * | 3/1998 | Hayward | B25J 9/1085 |
| | | | | 248/636 |
| 5,794,487 | A | 8/1998 | Solomon et al. | |
| 9,919,434 | B1 * | 3/2018 | Rey | B25J 9/0075 |
| 2003/0062858 | A1 | 4/2003 | Shimizu et al. | |
| 2005/0007055 | A1 * | 1/2005 | Borenstein | B08B 9/045 |
| | | | | 318/568.12 |
| 2005/0113964 | A1 | 5/2005 | Van Der Meulen | |
| 2009/0314119 | A1 * | 12/2009 | Knoll | A61B 1/00156 |
| | | | | 74/490.01 |
| 2010/0030377 | A1 * | 2/2010 | Unsworth | B25J 9/06 |
| | | | | 700/245 |
| 2010/0196124 | A1 | 8/2010 | Fukuma et al. | |
| 2011/0184558 | A1 | 7/2011 | Jacob et al. | |
| 2011/0238205 | A1 | 9/2011 | Kemp et al. | |
| 2015/0135880 | A1 | 5/2015 | Zaruba et al. | |
| 2016/0031080 | A1 * | 2/2016 | Rey | B25J 9/0075 |
| | | | | 74/490.05 |
| 2016/0114479 | A1 * | 4/2016 | Rosheim | B25J 9/0075 |
| | | | | 74/490.03 |
| 2016/0151910 | A1 * | 6/2016 | Sanatkar | B25J 9/06 |
| | | | | 74/490.03 |
| 2017/0020100 | A1 | 1/2017 | Hofman et al. | |
| 2017/0354518 | A1 * | 12/2017 | Park | B25J 13/089 |

OTHER PUBLICATIONS

Gonzalez et al., Design and analysis of 6-DOF triple scissor extender robots with applications in aircraft assembly. IEEE Robotics and Automation Lett. Jul. 2017;2(3):1420-7.

Hawkes et al., A soft robot that navigates its environment through growth. Sci Robot. Jul. 19, 2017;2:eaan3028(1-7).

International Search Report and Written Opinion dated Nov. 21, 2018 for Application No. PCT/US2018/047218.

Bonev, Direct kinematics of zero-torsion parallel mechanisms. Proceedings—2008 IEEE Intl Conf on Robotics and Automation (ICRA). May 19-23, 2008, Pasadena, CA, pp. 3851-3856. doi: 10.1109/ROBOT.2008.4543802.

Briot et al., Singularity analysis of zero-torsion parallel mechanisms. Proceedings—2008 IEEE/RSJ Intl Conf on Intelligent Robots and Systems (IROS). Sep. 22-26, 2008. Nice, France. pp. 1952-1957. doi: 10.1109/IROS.2008.4650574.

Chen et al., Modular continuum robotic endoscope design and path planning. Proceedings—2014 IEEE Intl Conf on Robotics and Automation (ICRA), May 31-Jun. 7, 2014. Hong Kong, China. pp. 5393-5400. doi: 10.1109/ICRA.2014.6907652.

Collins et al., Design of a spherical robot arm with the spiral zipper prismatic joint. Proceedings—2016 IEEE Intl Conf on Robotics and Automation (ICRA), May 16-21, 2016. Stockholm, Sweden. pp. 2137-2143. doi: 10.1109/ICRA.2016.7487363.

Felt et al., An inductance-based sensing system for bellows-driven continuum joints in soft robots. Proceedings—2017 Conf on Robotics: Science and Systems. Jul. 12-16, 2017. Cambridge, MA. Accessed online http://rss2017.lids.mit/edu/program/papers/06.pdf. 10 pages.

Friesen et al., The second generation prototype of a duct climbing tensegrity robot, DuCTTv2. Proceedings—2016 IEEE Intl Conf on Robotics and Automation (ICRA). May 16-21, 2016. Stockholm, Sweden. pp. 2123-2128. doi: 10.1109/ICRA.2016.7487361.

Greer et al., Series pneumatic artificial muscles (sPAMs) and application to a soft continuum robot. 2017 IEEE Intl Conf on Robotics and Automation (ICRA). May 29-Jun. 3, 2017. Singapore. 2017:5503-5510. doi: 10.1109/ICRA.2017.7989648. Epub Jul. 24, 2017.

Hammond et al., Pneumatic reel actuator: Design, modeling, and implementation. Proceedings—2017 IEEE Intl Conf on Robotics and Automation (ICRA), IEEE, May 29-Jun. 3, 2017, pp. 626-633. Doi: 10.1109/ICRA.2017.7989078. Accessed online http://shape.stanford.edu/research/pneumaticReelActuator/SHammond_ICRA_2017. 8 pages.

Hirose et al., Snake-like robots: Machine design of biologically inspired robots. IEEE Robotics and Automation Magazine. Mar. 2009;16(1):88-98.

Lozano-Perez, Spatial planning: A configuration space approach. IEEE Transactions on Computers. Feb. 1983. vol. C-32, No. 2, pp. 108-120. Accessed online http://lis.csail.mit.edu/pubs/tlp/spatial-planning.pdf.

Matsuno et al., Rescue robots and systems in Japan. Proceedings—2004 IEEE Intl Conf on Robotics and Bimimetics, Aug. 22-26, 2004, Shenyang, China. pp. 12-20. doi: 10.1109/ROBIO.2004. 1521744.

Slatkin et al., The development of a robotic endoscope. Proceedings—1995 IEEE/RSJ Intl Conf on Intelligent Robots and Systems (IROS). Human Robot Interaction and Cooperative Robots. vol. 2, pp. 162-171. Aug. 5-9, 1995. Pittsburgh, PA. doi: 10.1109/IROS.1995. 526155.

Wang et al., A unified algorithm to determine the reachable and dexterous workspace of parallel manipulators. Robotics and Computer-Integrated Manufacturing. 2010;26(5):454-60.

Woodruff et al., Zipper mast for enhanced communications and surveillance. Proc. SPIE 8045, Unmanned Systems Tech XIII, 804512(1-6), May 23, 2011. doi: 10.1117/12.885525.

Wright et al., Design and architecture of the unified modular snake robot. Proceedings—2012 IEEE Intl Conf on Robotics and Automation (ICRA), St. Paul, May 14-18, 2012, St. Paul, MN. pp. 4347-4354.

Wright et al., Design of a modular snake robot. Proceedings—2007 IEEE/RSJ Intl Conf on Intelligent Robots and Systems (IROS). Oct. 29-Nov. 2, 2007. San Diego, CA. pp. 2609-2614.

Yanez-Valdez, Analysis and stiffness evaluation of a microparallel kinematic machine. DYNA. Jun. 2017;84(201):224-33.

* cited by examiner

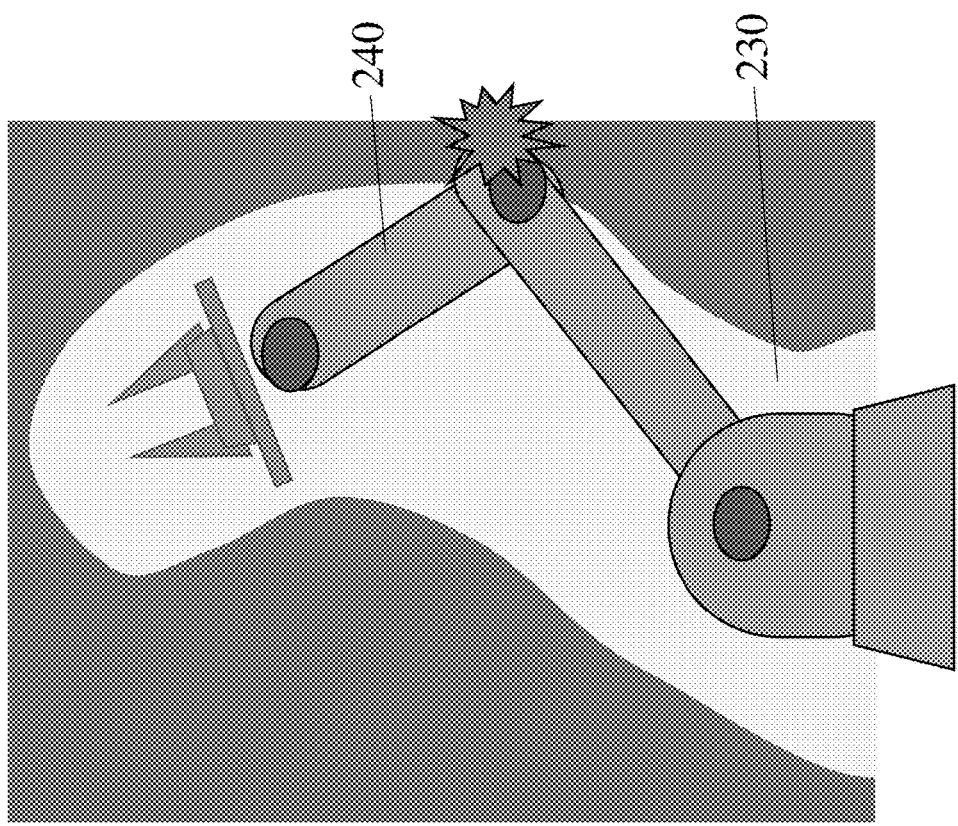
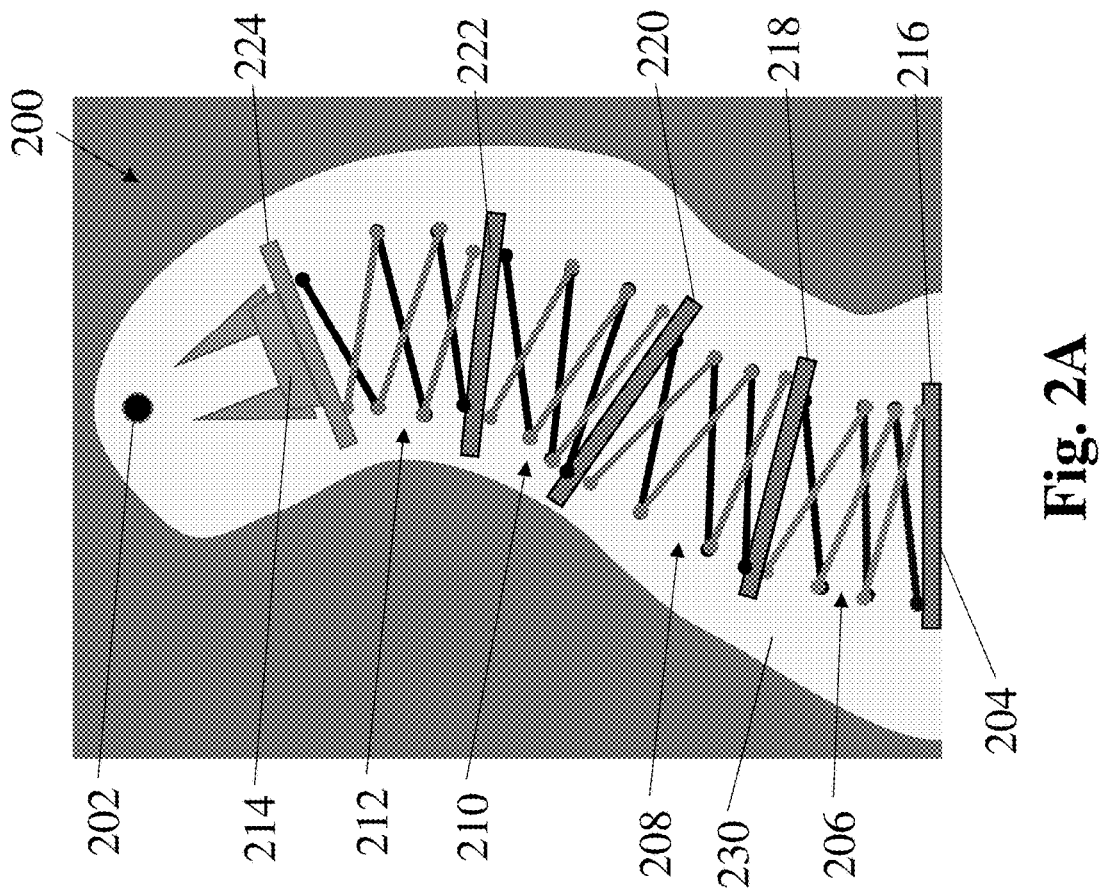
Fig. 2A
Fig. 2B (Prior Art)

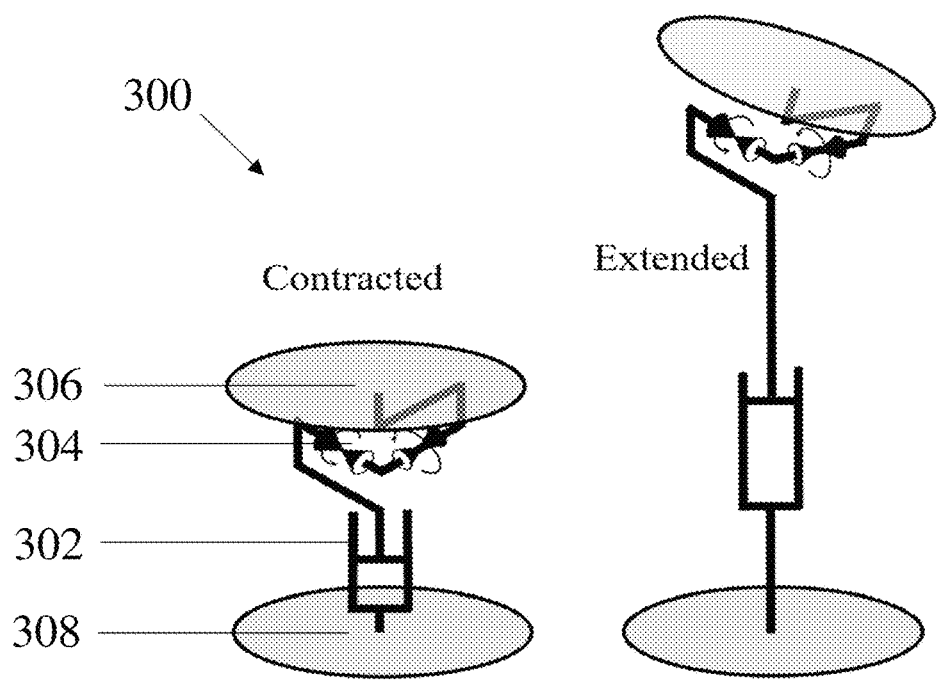
Fig. 3A  Fig. 3B
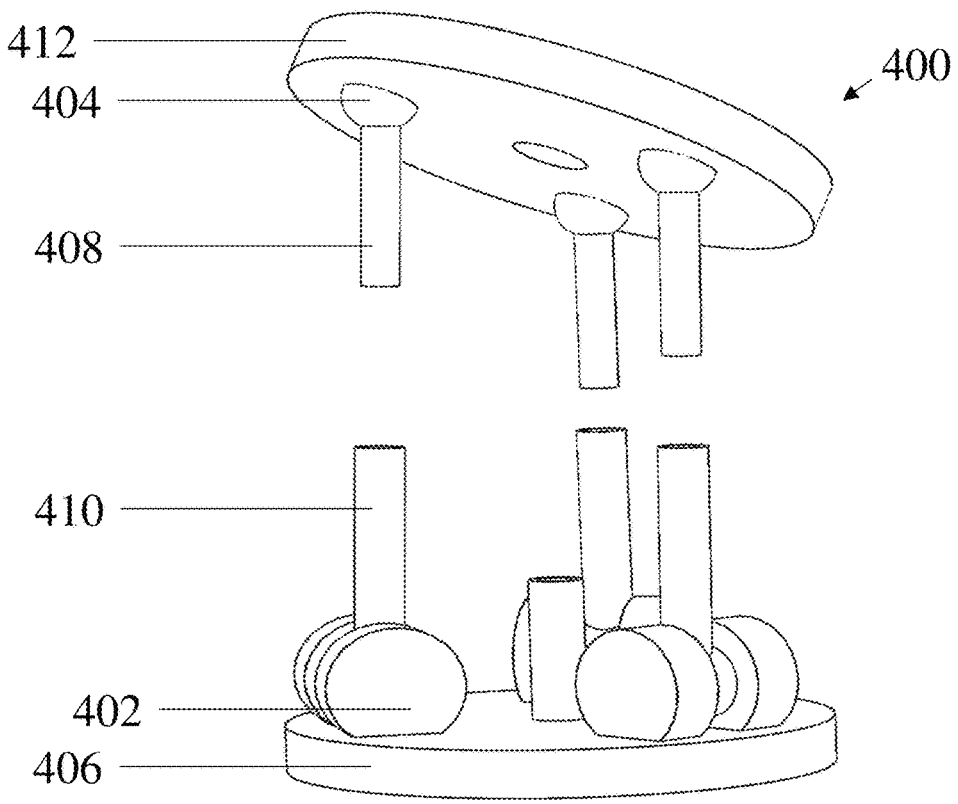
Fig. 4

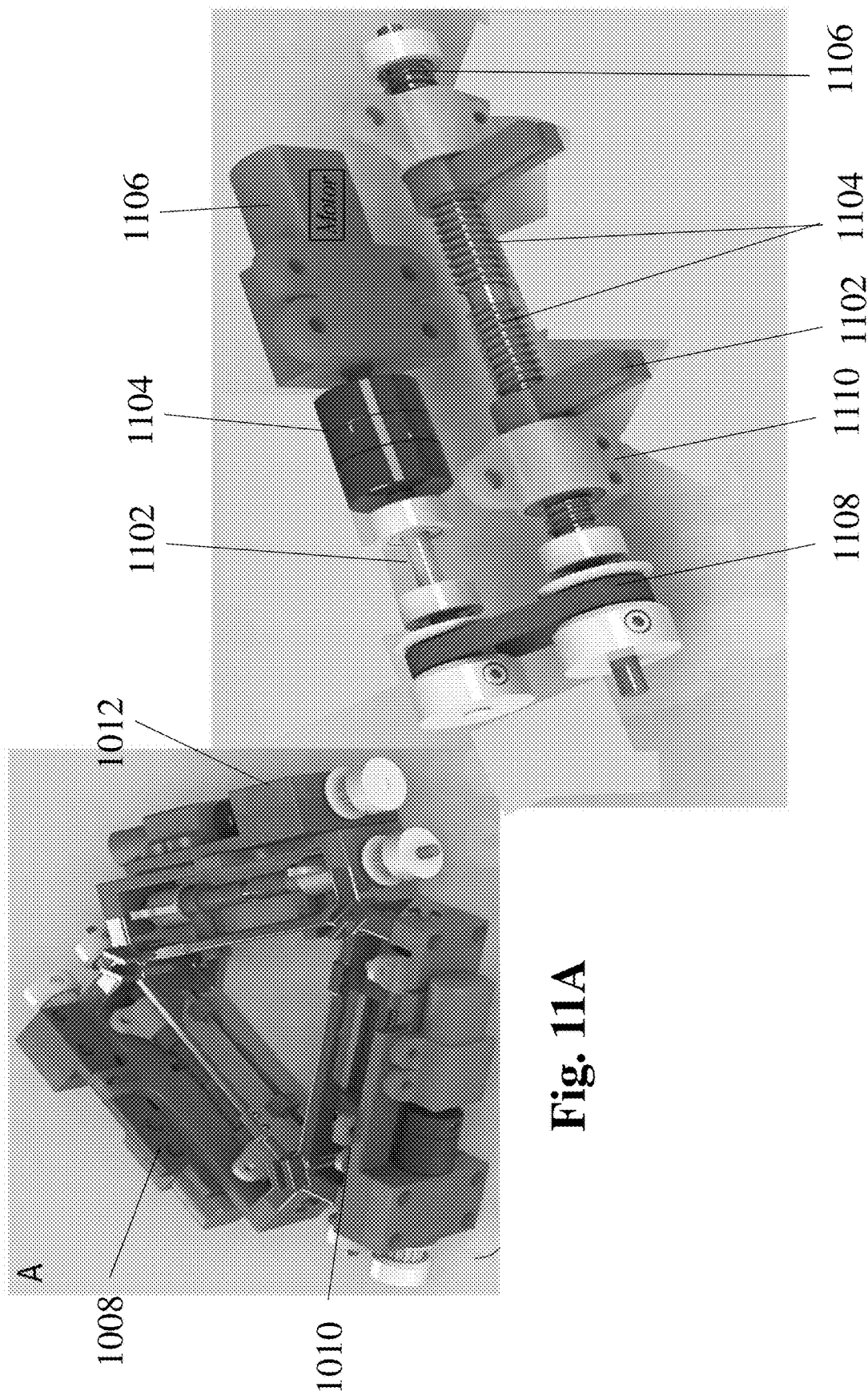

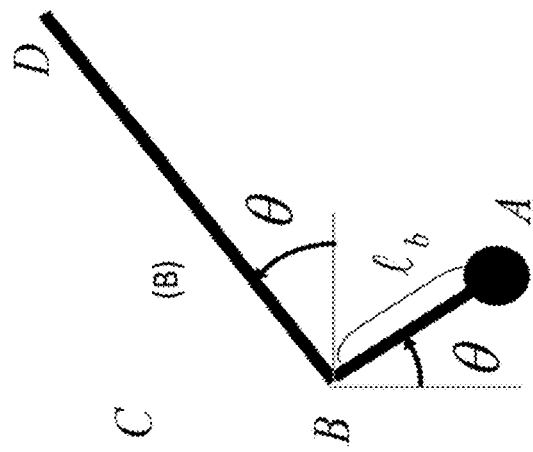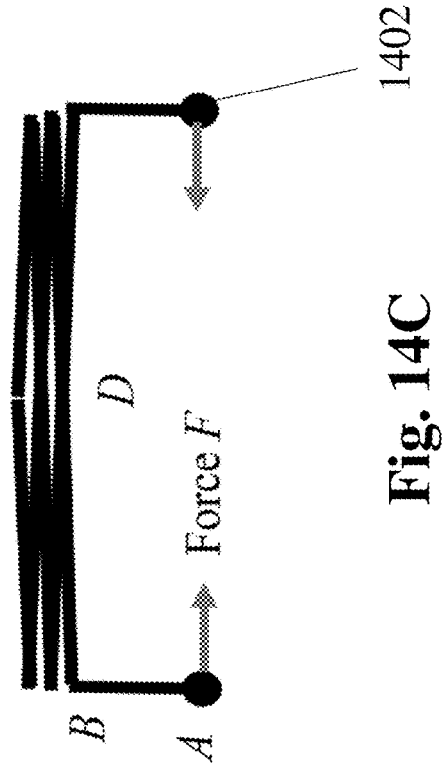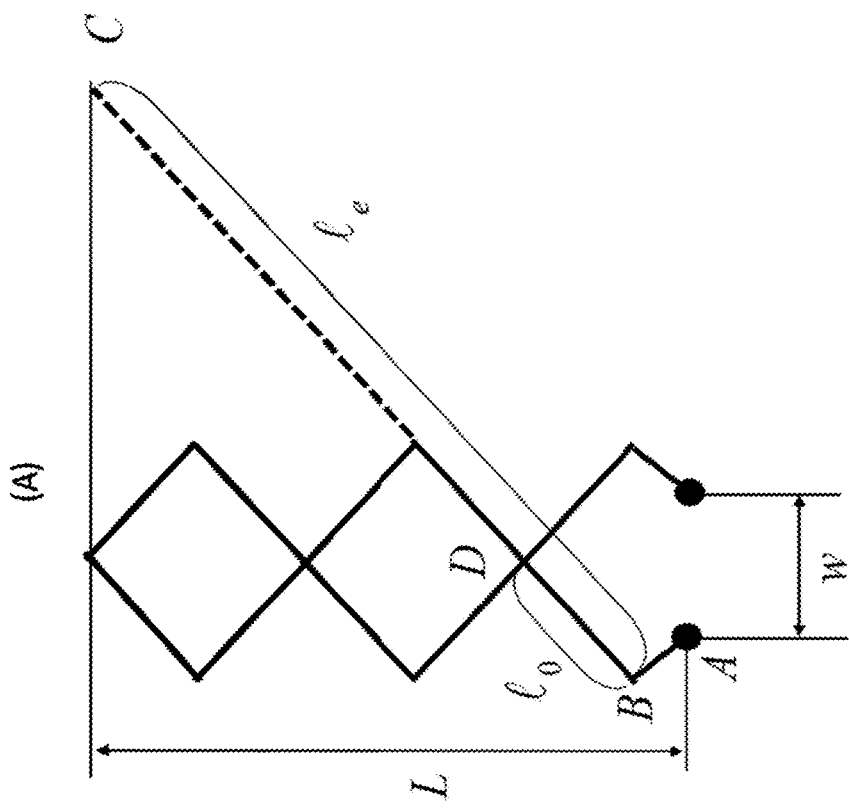
Fig. 14A
Fig. 14B
Fig. 14C

EXTENDING ROBOTIC ARM

CROSS-REFERENCE TO RELATED APPLICATIONS

This application claims the benefit under 35 U.S.C. § 119(e) of U.S. provisional application Ser. No. 62/548,065, filed Aug. 21, 2017, the disclosure of which is incorporated by reference in its entirety.

FIELD

Disclosed embodiments are related to manipulation of expandable robotic arms.

BACKGROUND

Robotic systems are often used to take on mechanical tasks that are considered difficult for a manual laborer to accomplish consistently. In some instances, these tasks may involve using robotic arms to perform tasks in confined spaces that prevent or otherwise limit human operators from accomplishing the task as well.

SUMMARY

According to one embodiment, a robotic arm comprises a plurality of expandable segments connected in series from a proximal most expandable segment to a distal most expandable segment. Each expandable segment of the plurality of expandable segments may be individually actuable to linearly extend and tilt a distal portion of the expandable segment.

According to one embodiment, a method of operating a robotic arm comprises sequentially controlling an extension and tilt of a plurality of expandable segments of the robotic arm from a proximal most expandable segment to a distal most expandable segment of the robotic arm.

According to another embodiment, a method of moving a robotic arm from a first position to a second position comprises determining a collision-free path from the first position to the second position through an environment, determining a sequence of physically possible linear and tilt displacements for a plurality of expandable segments of the robotic arm, arranged in series for moving the robotic arm from the first position towards the second position along the collision free path without contacting one or more obstacles in the environment, and executing the sequence of displacements of the plurality of expandable segments such that the robotic arm expands from the first position to the second position.

In some embodiments involving the devices and/or methods described herein, a robotic arm may further comprise a controller operatively coupled to the plurality of expandable segments, wherein the controller is configured to sequentially expand and/or tilt the plurality of expandable segments from the proximal most expandable segment to the distal most expandable segment.

In some embodiments involving the devices and/or methods described herein, the plurality of expandable segments may be individually actuable to tilt the distal portion of the expandable segment in a combination of two axial directions perpendicular to the direction of linear extension.

In some embodiments involving the devices and/or methods described herein, each expandable segment may comprise at least a first linear actuator and a second linear actuator extending between a proximal portion of the expandable segment and a distal portion of the expandable segment, wherein controlling the relative extension of the first and second linear actuators controls an extension and tilt of the distal portion relative to the proximal portion of the expandable segment.

In some embodiments involving the devices and/or methods described herein, each expandable segment further may comprise a third linear actuator extending between the proximal and distal portions of the expandable segment.

In some embodiments involving the devices and/or methods described herein, controlling the relative extension of the first, second, and third linear actuators controls the tilt of the distal portion relative to the proximal portion of the expandable segment in at least two directions.

In some embodiments involving the devices and/or methods described herein, a proximal end of each linear actuator may be a revolute joint, and the distal end of each linear actuator is a spherical joint.

In some embodiments involving the devices and/or methods described herein, the first and second linear actuators may be scissor lifts.

In some embodiments involving the devices and/or methods described herein, a proximal end of each scissor lift may include an elongate section parallel to a longitudinal axis of the scissor lift.

In some embodiments involving the devices and/or methods described herein, each expandable segment may comprise at least a first linear actuator and a rotational actuator coupled to a distal end of the linear actuator.

In some embodiments involving the devices and/or methods described herein, the robotic arm may further include an end effector coupled to the distal most expandable segment.

In some embodiments involving the devices and/or methods described herein, an optical and/or distance detector may be mounted on a distal portion of distal most segment of a robotic arm.

In some embodiments involving the devices and/or methods described herein, a robotic arm may further comprise optical and/or distance detectors mounted on individual segments to detect a radial distance to surrounding obstacles in the environment.

In some embodiments involving the devices and/or methods described herein, sequentially expanding and/or tilting the plurality of expandable segments may move the robotic arm from an initial position to a target position.

In some embodiments involving the devices and/or methods described herein, sequentially expanding and/or tilting the plurality of expandable segments may include actively correcting the tilt and/or extension of the segments to avoid obstacles in a surrounding environment as the robotic arm moves to the target position.

In some embodiments involving the devices and/or methods described herein, controlling a tilt of the plurality of expandable segments may include tilting the plurality of expandable segments in a combination of two axial directions perpendicular to a direction of linear extension of the individual segments.

In some embodiments involving the devices and/or methods described herein, controlling a tilt of the plurality of expandable segments may include changing the relative extension of two or more portions of an expandable segment.

In some embodiments involving the devices and/or methods described herein, controlling a tilt of the plurality of expandable segments may include changing the relative extension of three or more portions of an expandable segment.

In some embodiments involving the devices and/or methods described herein, sequentially controlling the extension and tilt of a plurality of expandable segments of a robotic arm may include sequentially controlling an extension and tilt of a first expandable segment located at a proximal end of the arm, controlling an extension and tilt of a second expandable segment connected to a distal portion of the first expandable segment, and controlling an extension and tilt of a third expandable segment connected to a distal portion of the second expandable segment.

In some embodiments involving the devices and/or methods described herein, a method of controlling a robotic arm may include rotating an end effector to align the end effector with a final target position.

In some embodiments involving the devices and/or methods described herein, a method of moving a robotic arm from a first position to a second position further comprises detecting a longitudinal and radial position of one or more obstacles relative to a distal end of the robotic arm, and wherein determining the collision free path is based at least partly on the detected longitudinal and radial position of the one or more obstacles.

In some embodiments involving the devices and/or methods described herein, a method of moving a robotic arm from a first position to a second position may include detecting a radial distance from one or more expandable segments of the plurality of expandable segments to one or more obstacles disposed around the one or more expandable segments, and adjusting a tilt and/or extension of the one or more expandable segments to move the one or more expandable segments closer to the collision free path.

In some embodiments involving the devices and/or methods described herein, a method of moving a robotic arm from a first position to a second position may include maintaining a position of each expandable segment within a deviation threshold from the collision free path.

In some embodiments involving the devices and/or methods described herein, a method of moving a robotic arm from a first position to a second position may include maintaining an average position of the expandable segments within a deviation threshold from the collision free path.

In some embodiments involving the devices and/or methods described herein, determining a collision free path, determining a sequence of displacements, and executing the sequence of displacements may be performed in real time using a feedback loop.

In some embodiments involving the devices and/or methods described herein, determining a sequence of displacements may include determining a set of physically possible displacements of an individual expandable segment along a collision free path, selecting a displacement of the individual expandable segment according to one of the set of physically possible displacements, and adding the selected displacement to the sequence of displacements.

In some embodiments involving the devices and/or methods described herein, selecting a displacement of the individual expandable segment may include selecting a maximum obstacle free displacement of the individual expandable segment.

In some embodiments involving the devices and/or methods described herein, a method of moving a robotic arm from a first position to a second position may include determining a maximum obstacle free displacement of the individual expandable segment using a binary search algorithm applied to a set of physically possible displacements of the individual expandable segment.

In some embodiments involving the devices and/or methods described herein, executing a sequence of displacements with a robotic arm may include applying the sequence of displacements sequentially from a proximal most expandable segment to a distal most expandable segment.

In some embodiments involving the devices and/or methods described herein a collision free path may be a centerline between obstacles.

In some embodiments involving the devices and/or methods described herein, a method of moving a robotic arm from a first position to a second position may include receiving optical and/or distance sensor input from the distal end of the arm and using the optical and/or distance sensor input to determine a direction and magnitude of an extension and/or tilt of at least one expandable segment of the robotic arm.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2A is a schematic view of a robotic arm according to one embodiment within a representative narrow passage;

FIG. 2B is a schematic view of a prior art robotic arm within a representative narrow passage FIG. 3A is a diagrammatic view of an expandable segment of a robotic arm in a retracted state according to one embodiment;

FIG. 3B is a diagrammatic view of the expandable segment of FIG. 3A in an extended and tilted configuration;

FIG. 4 is a side elevation view of an expandable segment of a robotic arm according to one embodiment, with portions separated for clarity;

FIG. 11A is a perspective view of the motor drivers of a robotic arm according to one embodiment;

FIG. 11B is a perspective view of one of the motor drivers of FIG. 11A;

FIGS. 14A-14C is a kinematic diagram of a single scissor linkage in extended and retracted states;

DETAILED DESCRIPTION

Figure 1A:
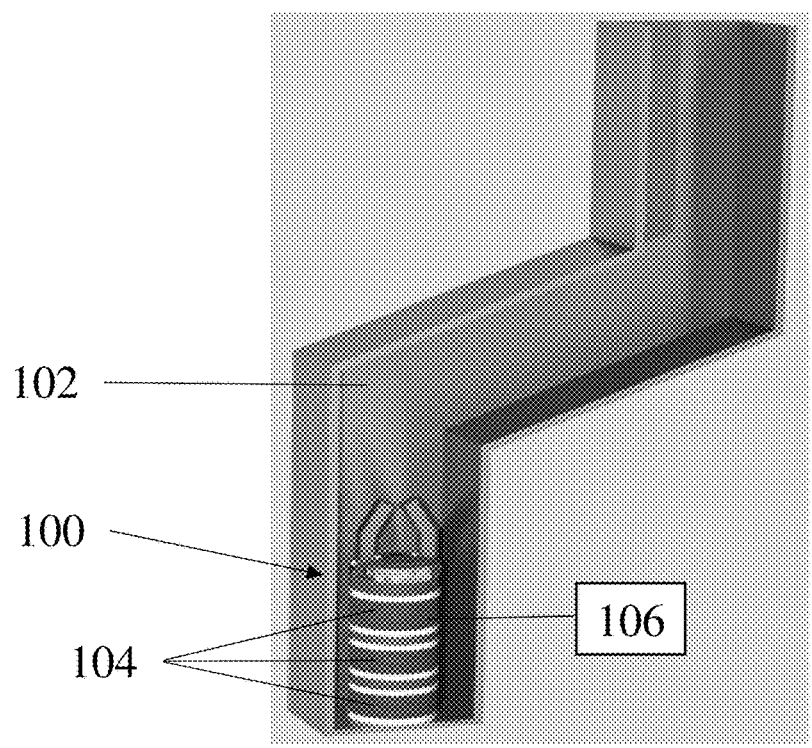
FIG. 1A is a perspective view of a robotic arm, in a retracted configuration, according to one embodiment within a representative narrow passage.

Industry workers are frequently tasked with reaching target points through narrow gaps between obstacles during the assembly, maintenance, and inspection of complex machinery. The aircraft and automobile manufacturing industries, for example, frequently rely on a technician's ability to fit into tight spaces for visual, force, and torque inspection along with various fastening tasks. These assembly and maintenance tasks are heavily dependent upon skilled manual labor. Although humans are dexterous and flexible, those tasks demand the worker to take laborious and fatiguing postures. Due to human kinematic and spatial limitations, these tasks can result in worker injury and decreased productivity. Repetitively taking those postures for extended periods accelerates fatigue, and may lead to injuries. No effective technology is currently available for replacing the manual labor, or assisting the workers to reduce their workload.

Traditional robotic arms are ill fitted to accessing confined areas. The kinematic and structural properties of traditional articulated robots are a mismatch for tasks involving accessing confined spaces. Bulky elbow, wrist, and links may interfere with obstacles at the last one foot area, and are size excluded within narrow channels. Additionally, open kinematic chain robots solve complex path planning problems when accessing confined spaces. These robots also perform computationally expensive collision checks for a full trajectory of every rigid body of the robot in order to generate a feasible path. This class of challenging works is referred to as "the Last One Foot Problem" for the purposes of this disclosure. While today's industrial robots are capable of carrying a heavy end-effector and precisely locating it in 3D space, the bulky arm links and, particularly, the wrist and gripper are unable to navigate the confined, cluttered, and narrow paths associated with complex assembly and maintenance tasks. The Last One Foot Problem is a common problem faced by many sectors of industry, yet no consistent, systematic, solution has yet been found. The inventors have recognized that the new types of robotic systems and methods of operation disclosed herein may help to meet the challenges presented by such environments.

The current disclosure presents a new approach for accessing confined spaces in manufacturing and other environments including obstacles. In one embodiment, a self-supporting robotic arm may be capable of moving through an environment including one or more obstacles including, for example, narrow, winding passages and/or spaces while carrying a payload, end effector, and/or other appropriate component. In one embodiment, a robotic arm may include a plurality of expandable segments connected in series with each other. The plurality of expandable segments may include a proximal most expandable segment and a distal most expandable segment as well as one or more intermediate expandable segments disposed between the proximal and distal segments. Each of the expandable segments may be individually actuatable such that a distal portion of each individual segment may be linearly extended and/or tilted relative to a proximal portion of the expandable segment.

In some embodiments, a robotic arm may be operated to navigate an environment including one or more obstacles by sequentially extending the robotic arm from a proximal most unactuated portion of the robotic arm. For example, the extension and tilt of a plurality of expandable segments may be actuated sequentially from a proximal most expandable segment to a distal most expandable segment to move the robotic arm to a desired position and orientation. For example, a first proximal most expandable segment of the robotic arm may be actuated to provide a desired extension and tilt to a second expandable segment connected to the first proximal most expandable segment. The second segment may then be subsequently extended and/or tilted to provide a desired extension and tilt to a third expandable segment attached to the second expandable segment. This process may be continued until either all of the expandable segments, up to and including the distal most expandable segment, have been sequentially actuated and/or the robotic arm has reached its target position and orientation. In some embodiments, after each expandable segment has been actuated to a desired position and orientation it may be fixed, and/or otherwise maintained, in that position and orientation while the remaining expandable segments located distally from the actuated expandable segment are subsequently actuated. By expanding each segment in turn, beginning with the proximal end of the robotic arm out to a distal end of the robotic arm, and by further allowing each segment to tilt as needed over the course of expansion, the disclosed robotic arms are capable of snaking through and around tight serpentine areas, and other types of environments, not otherwise accessible by humans or more traditional robotic arrangements.

The above described method of operating a robotic arm offers several benefits. Specifically, if a proximally located segment of a robotic arm were actuated after and/or concurrently with one or more distally located segments, a controller associated with the robotic arm would need to control the tilt and/or extension of every segment of the robotic arm simultaneously to accommodate for changes to the position and orientation of distally located sections of the robotic arm. Thus, by having the robotic arm expand from the proximal segments first, the expanded segments do not need to be adjusted due to actuation of distally located segments changing the position and orientation of the actuated portions of the robotic arm. Such an arrangement is reminiscent of how plant growth where a growing tip continues to extend around and past obstacles in an environment while the stem and base of the plant remain fixed in place during subsequent plant growth.

In some embodiments, each expandable segment may include a prismatic degree of freedom to expand the segment in an axial direction of the segment. In some embodiments, each segment may further include its own rotational degrees of freedom to "tilt" the segment in at least one or two directions. As described further below, any appropriate actuator arrangement may be used to provide the desired extension and tilting capabilities of the individual extendable segments. For example, various types of linear actuators may be combined with one, two, or any appropriate number of rotational actuators to separately provide linear extension and tilting capabilities for the various segments. Alternatively, combinations of two or more linear actuators attached to and extending between proximal and distal portions of an expandable segment may be used to control the relative extension applied to different portions of an expandable segment which may result in tilting of the proximal and distal portions of an expandable segment relative to each other. Accordingly, it should be understood that the current disclosure is not limited to any particular arrangement of actuators to provide the desired extension and tilting capabilities of the extendable segments disclosed herein.

According to some embodiments, the individual expandable segments of a robotic arm may include a proximal base and a distal portion connected by two or more linear actuators. In some instances, the distal portion of an expandable segment may function as and/or be connected to the proximal base of a separate expandable segment connected to the distal portion. Depending on the desired degrees of freedom, the expandable segment may include two or more linear actuators, three or more linear actuators, or any appropriate number of linear actuators attached to and extending between the base and distal portion of the expandable segment. The linear actuators may be spaced apart from one another such that when the linear actuators expand at the same rate, the expandable segment expands linearly, but when the linear actuators expand at different rates, the difference in extension of the various portions of the distal portion relative to the base tilts the distal portion, and a portion of the robotic arm attached to the distal portion, in a desired direction. This type of structure may allow the individual expandable segments to have at least two or three degrees of freedom. For example, an expandable segment may have a prismatic or linear degree of freedom from expanding the linear actuators as well as one or two degrees of freedom for tilting.

In some embodiments, the linear actuators of an expandable segment may be attached to a base plate by a revolute joint at its proximal end that allows a single degree of rotational freedom between the linear actuator and plate. Correspondingly, the linear actuators may be attached to the distal plate by a spherical joint, which may provide three degrees of rotation freedom between the distal plate and the linear actuators. Such a structure may be beneficial in accommodating the relative motions of the actuators, base plate, and distal plate during actuation of an expandable segment.

A variety of possible linear actuators may be used with the disclosed expandable segments including, but not limited to, scissor lifts, inflatable bellows, inflatable tubes, pneumatic linear actuators, hydraulic linear actuators, solenoids, rotary motors attached to cam shafts, and/or any other actuator capable of creating a linear or prismatic movement. These actuators may include various appropriate arrangements of motors, position encoders, and/or controllers such that the actuators may either be controlled collectively and/or individually to adjust an extension and/or tilt of a segment.

In some embodiments, a scissor lift used as a linear actuator may be beneficial due to the high expansion ratios afforded to scissor lifts which may provide a robotic arm with a larger range of motion. For embodiments that do use scissor lifts, the scissor lifts may include a proximal most linkage that includes an elongate section that extends in a direction that is parallel to an axis of the expandable segment when in the retracted configuration. The elongate sections may be shifted towards each other in order to extend the scissor lift. Such elongate sections may help to prevent the fully retracted expandable segment from being constrained by the singularity caused by a fully retracted scissor lift.

As noted previously, in some embodiments, a robotic arm may include an end-effector attached to a distal portion or end of the robotic arm. Depending on the embodiment, the end-effector may be directly, or indirectly, attached to the distal most expandable segment. The end-effector may have its own individual movement functionality, including the ability to rotate, extend, expand circumferentially, grip, fire projectiles, take measurements, sense environmental factors, and/or other possible functionalities depending on the intended use of the robotic arm. Contemplated end-effectors include grippers, screwdrivers, cameras or other sensors, and/or any other appropriate end-effector. Embodiments lacking end-effectors or having multiple end-effectors are contemplated as well.

For the purposes of this disclosure, extension, extending, prismatic extension, prismatic movement, and other similar terms may refer to the expansion of an expandable segment in a linear or axial direction relative to each segment. Tilting and/or rotation of a distal portion of an expandable segment may refer to orienting a distal portion of an expandable segment at a non-normal angle relative to an longitudinal axis of extension for the segment and/or a proximal portion of the segment. In some embodiments this may correspond to tilting in one, two, or any appropriate degrees of freedom. Additionally, depending on the particular type of actuator arrangements being used, some amount of panning of the individual segments may occur in addition to the desired prismatic extension and tilting.

In addition to the above, the term proximal may refer to being closer to a base or other support of a robotic arm, while the term distal may refer to being closer to an end of the robotic arm opposite the support or base. In some instances a payload and/or end-effector may be located at a distal end of a robotic arm. It should be understood that terms such as expandable, expansion, or expanded when used in the context of increasing the length of expandable segments or the length of a robotic arm may be used interchangeably with extendable, extension, extended, and/or other similar terms.

According to some embodiments, it may be desirable to appropriately plan a path of extension for a robotic arm without crashing into walls or obstacles present in an environment such as a passage. The inventors have contemplated that this could be accomplished in a variety of ways using the currently disclosed robotic arms that move using the disclosed proximal-to-distal expansion strategy. As detailed further below, in some embodiments, a collision free path may be determined and the expandable segments of the robotic arm may be actuated sequentially such that a distal end of the robotic system follows the collision free path. In some embodiments, the collision free path may be defined by a series of waypoints that are pre-determined by the robotic arm before executing a movement sequence.

In some embodiments, each waypoint represents the planned location for an individual expandable segment to reach by extending and/or tilting. As an example, the robotic arm expands to its target location by first expanding its proximal most expandable segment to reach the first waypoint, then the expandable segment distal to the first segment expands to reach a second waypoint and so forth until the end-effector or distal end of the robotic arm has reached the end target location. It should be understood that in these embodiments, the collision free path is not a pre-determined path with waypoints assigned along the path to be reached by the segments. Instead, the robotic arm determines the waypoints based on where immediate obstacles for the expandable segment in question are, and the sequence of waypoints determined individually in this manner together define the final collision free path taken by the overall robotic arm. However, embodiments where a pre-prescribed collision free path is first computed with waypoints assigned to that path subsequently are also contemplated and the current disclosure is not so limited.

Since the robotic arm expands sequentially beginning with the proximal most expandable segment in these embodiments, when one expandable segment reaches its waypoint, the remaining segments can expand using the new waypoint as an initial position without having to account for the location of the previously expanded segments because the expansion of the distal segments do not affect the previously expanded segments. This method of expansion allows the planning of individual waypoints to form an eventual path instead of having to plan the entire robotic arm movement at once, which can significantly reduce the required computational complexity required to actuate the robotic arm. These embodiments have the advantage of only computing optimal waypoints for a single three degree-of-freedom expandable segment at a given time. Once that waypoint is determined, the next waypoint is computed using the previous waypoint as a starting point, eliminating the need to consider the previous sequence of movements and therefore the need to computationally consider the larger movement sequence as a whole. As such, the peak power usage of the robotic arm according to these embodiments is significantly reduced at least in part due to the reduced computational complexity compared to what would be required of a more traditional robotic arm system that has to simultaneously compute how the movement of each limb section will contribute to navigating to the final destination.

In some applications, the collision free path may be a centerline between obstacles in an environment. For example, a robotic arm may follow a centerline through a passage. In instances where information regarding an environment and obstacles contained therein is already available, the collision free path may be a predetermined path that the robotic arm may be actuated to follow. However, embodiments in which the robotic arm determines and executes movement along a collision free path determined in real-time are also contemplated as the disclosure is not so limited.

In some embodiments, a robotic arm moves from a first position to a second position by first determining a collision-free path between the first and second positions through an environment. To accomplish this, the controller of the device may determine a sequence of physically possible linear and tilt displacements for the plurality of expandable segments from the first position to the second position along a collision-free path. For each individual expandable segment, the controller may determine a set of physically possible displacements along the collision free path. As will be described in detail below, an optimal displacement of the individual expandable segments may be chosen from the set of physically possible displacements and may be added to the overall sequence using a variety of possible methods including a binary search. Once the optimal sequence is determined, the planned sequence of displacements may be executed to sequentially expand and tilt the expandable segments of the robotic arm from the proximal most expandable segment to the distal most expandable segment to reach a desired goal and orientation with a distal end of the robotic arm.

In some embodiments, a robotic arm may pre-plan optimal navigation routes through an environment including intermediate waypoints to hit over the course of navigation. In these embodiments, the robotic arm may either sense information about the environment and/or the information may be provided to the robotic arm. For example, an existing model of the environment may be provided. In either case, the robotic arm may then plan sequential waypoints, with each successive waypoint indicating the target destination for successive segments of the robotic arm as discussed below.

In some embodiments, it may be desirable to control one or more aspects of a robotic arm based at least partly on information gathered from a surrounding environment. Accordingly, a robotic arm may include one or more sensors such as a camera, distance sensor, and/or any other appropriate sensor connected to the robotic arm proximate a distal end of the robotic arm. This sensor may actively detect and map obstacles disposed within a path of the robotic arm. Additionally, it may also be advantageous to include a plurality of additional sensors camera, distance, and/or other appropriate sensors located along the sides of each segment of a robotic device. These sensors may provide active distance feedback regarding the obstacles surrounding the device. These sensors may provide longitudinal and radial position information for the one or more obstacles relative to a distal end and/or the sides of a robotic arm. In such an embodiment, a robotic arm as described herein may still expand sequentially from a proximal to distal end of the robotic arm. However, instead of simply expanding from waypoint to waypoint, the robotic arm may also actively correct a tilt and extension of the already deployed segments to help maintain a position of the overall robotic arm relative to the desired collision free path. This control of the individual segments may be based at least partly on the longitudinal and/or radial position information provided by the above noted sensors. In some embodiments, the tilt and extension of each of the expandable segments may be adjusted to maintain each segment within a set deviation threshold from the collision free path. In other embodiments, the segments may be adjusted to maintain an average deviation of the segments from the collision free path to be less than a deviation threshold.

In embodiments including various types of sensors for detecting the presence and location of obstacles within an environment, these sensors may include but are not limited to: proximity sensors, optical sensors, ultrasound emitters/detectors, and infrared sensors. However it should be understood that any sensor capable of detecting topological and/or distance information related to obstacles contained in an environment may be used with the embodiments described herein.

In some embodiments, a robotic arm may include a plurality of proprioceptive sensors that monitor the position and orientation of each expandable segment and the robotic arm as a whole. In some embodiments, before making an expansion, a controller of the robotic arm may perform a collision check to ensure that the planned expansion would not collide with another expandable segment, or an obstacle around the robotic arm. Various sensors that may function as proprioceptive sensors may include gyroscopes, inclinometers, altimeters, cameras, position encoders, accelerometers, odometers, motor encoders, compasses, and inertial measurement units to name a few. However, other possible sensors that can convey information about the arm's position, orientation, and/or internal status may be used as well as the disclosure is not so limited.

In addition to controlling an extension of a robotic arm as described above to extend through an environment with obstacles such as a narrow passage, it may also be desirable to retract the robotic arm after performing a desired task. Thus, when the device is fully expanded or has reached its target destination and performed its task at the target destination, the device may be subsequently retracted. In some embodiments, a controller coupled to the various expandable segments may store the sequence of motor inputs applied to various segments during extension. For example, the controller may store the commands applied to the individual actuators and/or may receive a position signal from position encoders or other sensors associated with the various actuators. The controller may then command the various actuators to execute the opposite actuator commands to sequentially retract each expandable segment from a distal end to a proximal end of the robotic arm until the robotic arm is fully retracted. In some embodiments, especially embodiments where a payload has been delivered or picked up, or where environmental conditions may have changed, the robotic arm may retract the individual expandable segments using feedback from the aforementioned sensors attached to the body of the device as well as using proprioceptive feedback.

While a particular retraction method is described above, other methods of retracting or removing a robotic arm from an environment it has been deployed into, e.g. a passage, may be used. For example, in one embodiment the various actuators holding a robotic arm in a desired configuration may be released and/or the actuators may be backdrivable, this may then allow a user to simply pull the limp device from the passage.

While particular constructions and related control methods are disclosed herein, other constructions and control methods for controlling a robotic arm are contemplated as well. For instance, a robotic arm may include expandable segments having any appropriate construction capable of providing the desired extension and tilting capabilities for individual expandable segments. Further, different control methods may be used with the disclosed robotic arms. For example, in some embodiments, extension and retraction of the robotic arms may be controlled by a user. Further, embodiments where a robotic arm makes contact with obstacles and/or slides along the obstacles to navigate a passage or other environment are also contemplated. Additionally, embodiments where the robotic arm may make contact with obstacles to support parts of the device are also contemplated. Accordingly, it should be understood that the currently disclosed robotic arm constructions and control methods may be implemented in a variety of different ways as the current disclosure is not limited to only the specific constructions and methods described herein.

It should be understood that while the embodiments described herein are primarily directed to sequentially actuating portions of a robotic arm from a proximal most section towards a distal section of the robotic arm, the disclosure is not limited to only operating in this fashion. For example, in some embodiments the disclosed robotic systems may be operated such that multiple expandable segments may be actuated simultaneously and/or one or more proximally located expandable segments of a robotic arm may be actuated after the actuation of one or more distally located expandable segments as the disclosure is not limited in this manner.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
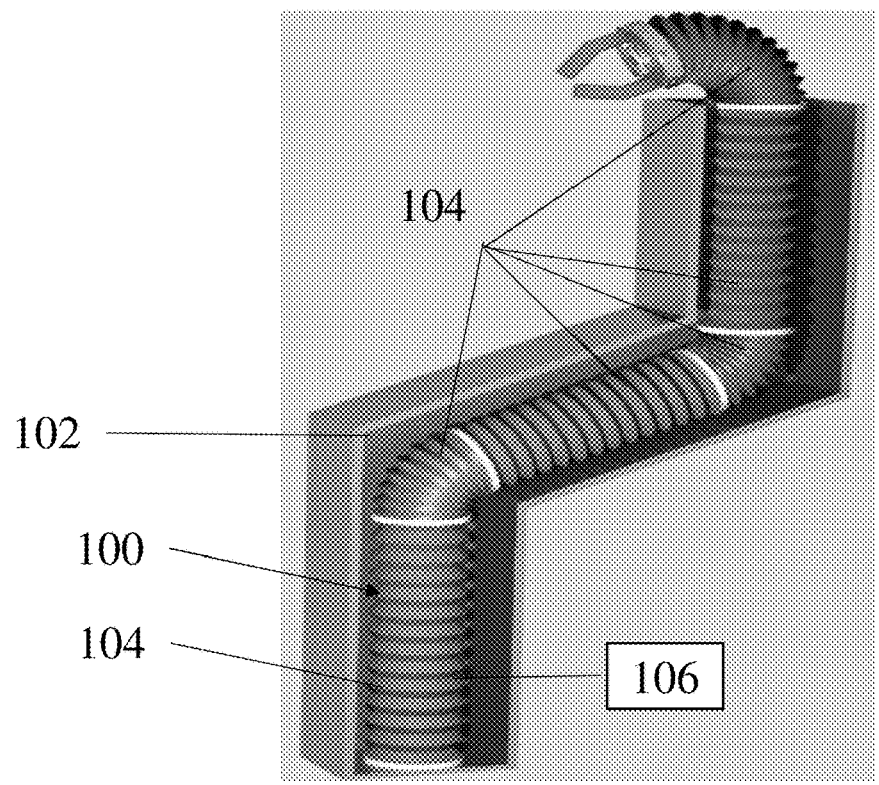
FIG. 1B is a perspective view of the robotic arm of FIG. 1A, in an extended configuration, within the representative narrow passage of FIG. 1A.

FIGS. 1A and 1B show an idealized version of a robotic arm 100 transitioning between a retracted and extended state through a passage 102 according to one embodiment. Passage 102 is illustrated as a serpentine confined space which may present significant difficulty for humans and existing robotic arms alike to navigate and operate in. As detailed further below, the robotic arm includes a plurality of serially arranged expandable segments 104 that are connected to each other in series. The expandable segments may be expanded sequentially from a proximal end of the robotic arm to a distal end of the robotic arm by a controller that is operatively coupled to the actuators and sensors, not depicted, associated with the plurality of expandable segments. Thus, as shown in FIG. 1B, these expandable segments may be expanded sequentially starting from the proximal most segment to distal most segment such that the robotic arm expands section by section to navigate the passage.

FIGS. 2A and 2B show a more detailed illustration of one embodiment of a robotic arm and a representative prior art robotic arm respectively. As can be seen, the prior art robotic arm 240 cannot easily navigate passage 230 due to the more traditional robotic arm using rotating parts of set length and likely adjusting distal portions of the robotic arm prior to proximal portions of the arm. Accordingly, the prior art robotic arm may be severely restricted in its ability to effectively control the position and orientation of an associated end-effector in such an environment without impacting the passage. In contrast, a robotic arm 200 as disclosed herein may have sufficient accuracy and dexterity to navigate passage 230 through the use of individual expandable segments actuated sequentially from a proximal to distal end of the robotic arm. In the depicted embodiment, the robotic arm 200 is made up of four expandable segments 206, 208, 210, and 212 connected to each other in series, as well as end-effector 214 attached to the distal most expandable segment 212. The first expandable segment includes a base plate 216 and a distal plate 218 connected by an appropriate combination of linear and/or rotational actuators as previously described. The second expandable segment 208 uses the first segment's distal plate as its own base plate. Similar to the first actuator, the base plate of the second expandable segment is connected to distal plate 220 by an appropriate arrangement of actuators. Similarly, the third expandable segment 210 includes opposing plates 220 and 222 connected to each other by actuators, and the fourth expandable segment 212 comprises plate 222 which is connected to plate 224 by a desired arrangement of actuators. In the depicted embodiment, the proximal base 204 of the first expandable segment is located at the proximal most end of the device, while the end-effector 224 is located at and connected to the distal most expandable segment of the robotic arm. In the figure, the robotic arm has a target destination at the end of the passage 202. As should be evident from the figure, the differential extension and tilts of the various expandable segments allows the robotic arm 200 to easily navigate the passage to reach the desired target position and orientation. This is in contrast to the prior art robotic arm 240 which is unable to reach the desired position and orientation without colliding with the passage.

FIGS. 3A and 3B show one embodiment of a potential arrangement of the actuators of a single expandable segments 300 in an extended and contracted state. In the figures, the expandable segment 300 includes a base plate 308 and a distal plate 306 connected by prismatic joint 302 and two rotational joints 304. As can be seen in the extended version of the expandable segment 300, the prismatic joint 302 gives the expandable segment the ability to expand along a prismatic degree of freedom, while the rotational joints 304 allow the distal plate 306 to tilt in two different rotational directions. This permits the expandable segment to control both the extension and tilt of structures attached to the distal plate including, for example, a distal portion of a robotic arm which may include an end effector and/or one or more additional expandable segments attached thereto. For the purposes of this disclosure, the rotational joints may include any rotatable actuator capable of rotating a distal plate of an expandable segment relative to the proximal plate.

FIG. 4 shows one embodiment of an expandable segment 400 controlled using two or more linear actuators. In the depicted embodiment, the expandable segment 400 includes a base plate 406 and a distal plate 412 connected by three telescoping linear actuators. FIG. 4 is shown as upper and lower sections for ease of viewing. The proximal ends of the linear actuators 410 are attached to the base plate 406 by revolute joints 402, while the distal ends of the linear actuators 408 are attached to the distal plate by spherical joints 404. As can be in FIG. 4, the differential extension of the three linear actuators causes the distal plate 412 to be tilted relative to the base plate 406. Further, the spherical joints 404 may allow the distal plate 412 to tilt freely without torqueing the linear actuators, while the revolute joints 406 may allow the linear actuators and distal plate 412 to tilt relative to base plate 406.

Figure 5:
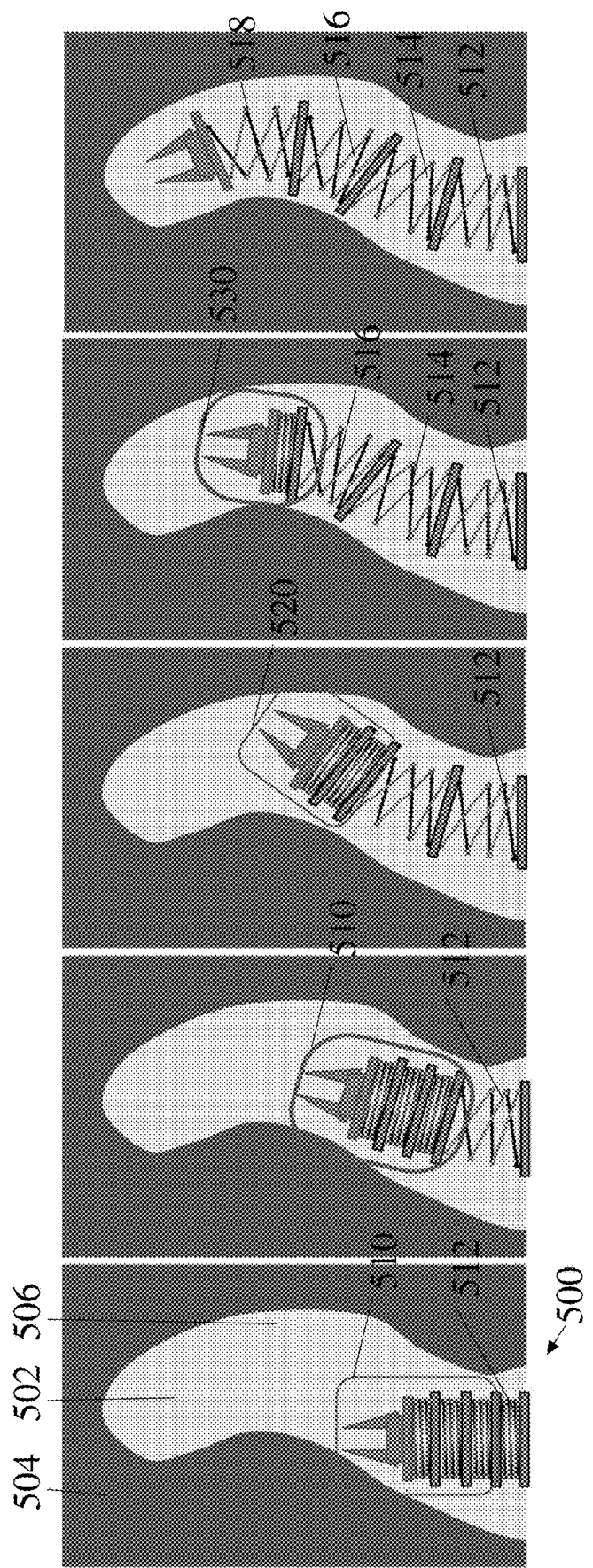
FIG. 5A is a schematic view of a robotic arm, in a retracted configuration, according to one embodiment.
FIG. 5B is a schematic view of the robotic arm of FIG. 5A, partially expanded.
FIG. 5C is a schematic view of the robotic arm of FIG. 5A, partially expanded.
FIG. 5D is a schematic view of the robotic arm of FIG. 5A, partially expanded.
FIG. 5E is a schematic view of the robotic arm of FIG. 5A, fully expanded.

FIGS. 5A through 5E show a robotic arm 500 according to one embodiment throughout the expansion process through a passage 506 in an environment 504 towards a target destination 502. The robotic arm consists of N segments with the proximal segment 512 being the first segment to expand. As described above, the robotic arm expands from the proximal segment 512 first, followed by the second segment 514, the third segment 516, and finally the fourth distal most segment 518. Starting with FIG. 5A, when expanding proximal segment 512, the remaining segments are fully contracted and are treated as a single rigid body together with the end-effector. This single rigid body is labeled 510 throughout the expansion process. In this embodiment, a trajectory can be found for the short interval from the initial starting point to a waypoint, which is a point along the centerline, or other collision free path, of the open space envelope that proximal segment 512 can reach. Possible interference between rigid body 510 and the passage 506 may be checked before expansion of each section. After reaching the first waypoint by expanding the proximal most segment 512, the proximal segment 512 may be fixed, and the next proximal most unexpanded segment 514 may be individually actuated to move the rigid body to a second waypoint as shown in FIG. 5C. The procedure of finding the next waypoint, checking for a collision, and expanding the proximal most unexpanded segment may be repeated for each of the remaining segments until the target destination is reached and/or the robotic arm is fully extended as shown in FIGS. 5D and 5E. As previously described, by actuating segments beginning with the most proximal unactuated segments, the robotic arm is able to expand through narrow passages without having to dynamically adjust the orientation of every segment. It should be noted that the rigid body 510 becomes smaller as this procedure repeats due to fewer unexpanded segments being included in the rigid body being translated through the passage.

Figure 6:
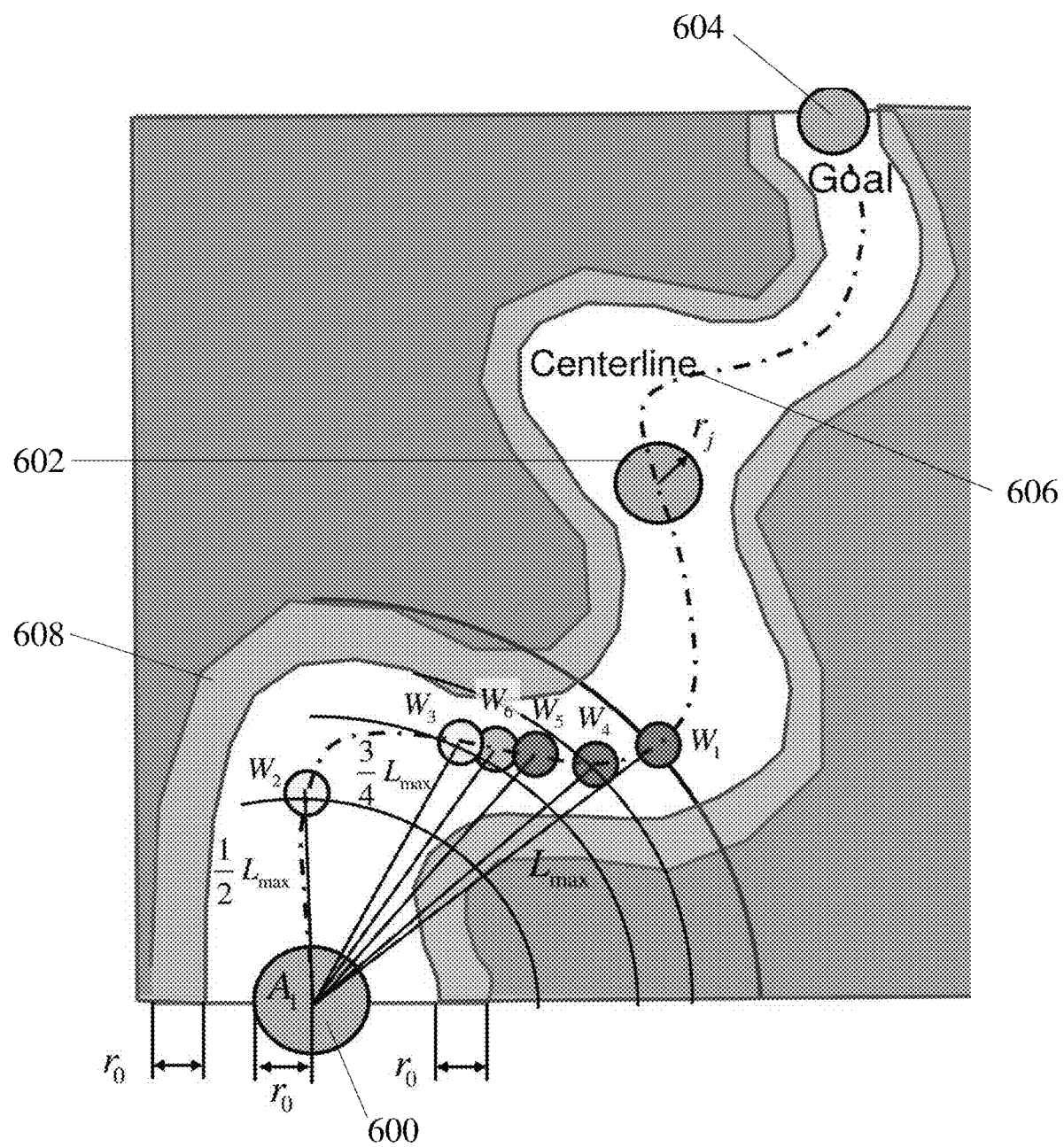
FIG. 6 is a schematic diagram depicting a method of determining a sequence of physically possible linear and tilt displacements for a plurality of expandable segments of a robotic arm as it moves through a narrow passage according to one embodiment.

FIG. 6 graphically illustrates one embodiment of a process of choosing an optimal sequence of movements of a robotic arm to reach a goal position and orientation 604 from an initial position and orientation 600 along a collision free path 606. In the depicted embodiment, a controller may determine one or more intermediate positions 602, i.e. waypoints, for controlling the extension and tilting of the various expandable segments to reach the goal position and orientation. For simplicity in the figure, the arm is represented as a ball and the collision-free path/centerline is shown by a dot-dash line. As detailed further below, in this particular embodiment, a binary search may be used for determining the different waypoints which in some embodiments may be selected to provide a maximum possible extension of the individual segments without impacting obstacles in the environment. However, other appropriate methods for determining appropriate intermediate waypoints may also be used.

Initially a collision free path 606 may be determined for extending a robotic arm through the illustrated passage. For example, the collision free path may be selected such that it is spaced from the walls of the passage, or other obstacles within the environment, by a distance that is equal to or greater than a radius $r_0$ of the robotic arm. This may be viewed as defining a prohibited area 608 that the robotic arm is maintained outside of. In one specific embodiment, the collision free path may be selected to follow a centerline through the passage and/or between other obstacles located within an environment. In either case, starting in the fully contracted state of the robotic arm at an initial position and orientation 600, possible collisions between the prohibited area 608 and the robotic arm during a first step of expansion may be checked. This may be done using either sensor input from one or more sensors located at a distal end of the robotic arm and/or using a pre-modeled representation of the passage or other environment. A controller of the robotic arm, which may include any appropriate processing unit, may determine the collision-free range of motion of the robotic arm using actuation of the proximal most unactuated expandable segment.

During a searching process for the next waypoint, the controller of the robotic arm may first determine a maximum extension $W_1$ of an expandable segment that is located along the collision free path 606. A line connecting the proposed waypoint at $W_1$ and the current position of the robotic arm at the initial position may be checked to determine if the line intersects the prohibited area 608 which may be indicative of the robotic arm contacting the passage or other obstacle. As shown in the figure the line connecting waypoint $W_1$ and the initial position 600 intersects the prohibit area. Therefore, this test point 606 is rejected because taking this possible waypoint would lead to a collision. Next, since a binary search algorithm is being applied, a radius of the possible extension length circle is halved, and a second waypoint candidate $W_2$ is determined based on where the half extension length intersects the collision free path, as shown in the figure. This time the line between the initial position and the second waypoint candidate is located entirely in the collision-free area. Thus, the controller stores the second waypoint candidate in a proposed sequence of movement. The controller then looks at a position located half way between the currently stored waypoint and the full expansion length of the robotic arm for additional possible waypoints. For instance, when the expansion radius is set at ¾ of the max expansion length, a third possible waypoint candidate $W_3$ is compared to the prohibited area to determine if it is a permissible collision free waypoint. The prior waypoint in the sequence is then replaced with the newly determined waypoint with the larger segment expansion. This process of checking intermediate waypoint candidates between collision free waypoints and waypoints that would result in collisions may be continued until an optimal waypoint point $W_6$ is found. If the binary search method does not yield a definite end point, exit conditions can be included such that the controller may determine a desired waypoint in another way.

After determining an initial waypoint between the initial 600 and goal 604 positions and orientations, additional waypoints may be determined by repeating the above described process for determining optimal extensions and waypoints for additional actuations of the various expandable segments of a robotic arm. For example, a selected waypoint in a sequence of determined movements may be used as a starting point for actuation of a subsequently actuated expandable segment and an optimized waypoint for actuation of the various expandable segments may be added to a desired sequence of displacements for a robotic arm. This sequence of displacements may then be applied to a robotic arm during an expansion of a robotic arm from an initial to a final goal position and orientation. Thus, a controller may individually determine an ideal waypoint for each expandable segment beginning with the proximal most expandable section through the distal most expandable section of a robotic arm. In some embodiments, a controller may determine all of the proposed waypoints in a sequence prior to executing movement of the robotic arm. Alternatively, in some embodiments, the waypoints and actuation of the robotic arm may occur in real time using appropriate feedback and control methods.

When executing a sequence of displacements for a robotic arm between two or more waypoints, a controller of a robotic arm may determine and apply the extension and tilt of the individual expandable segments of a robotic arm needed to reach the desired waypoints. In some embodiments, to expand to the next waypoint, a controller may use the straight line distance to the next waypoint to determine the a linear expansion to apply to an expandable segment to be actuated. Similarly, the controller may determine the tilt angles to be applied based on a direction of the straight line to the next waypoint. The determined extension and tilt may then be applied to the individual expandable segments to reach the desired waypoints.

While a binary search method for finding an optimal distance has been described above, it should be understood that other methods of searching datasets to optimize the displacements of the expandable segments of a robotic arm may be used. For instance, in some embodiments, a controller of a robotic arm may use a random tree search for endpoints along a collision free path to determine one or more intermediate waypoints. The controller may also use fixed length estimation or assign fit lines to the determined collision free path to determine its extension sequence. Accordingly, it should be understood that any appropriate method for determining a desired actuation of the expandable segments of a robotic arm may be used as the current disclosure is not limited in this fashion.

Figure 7:
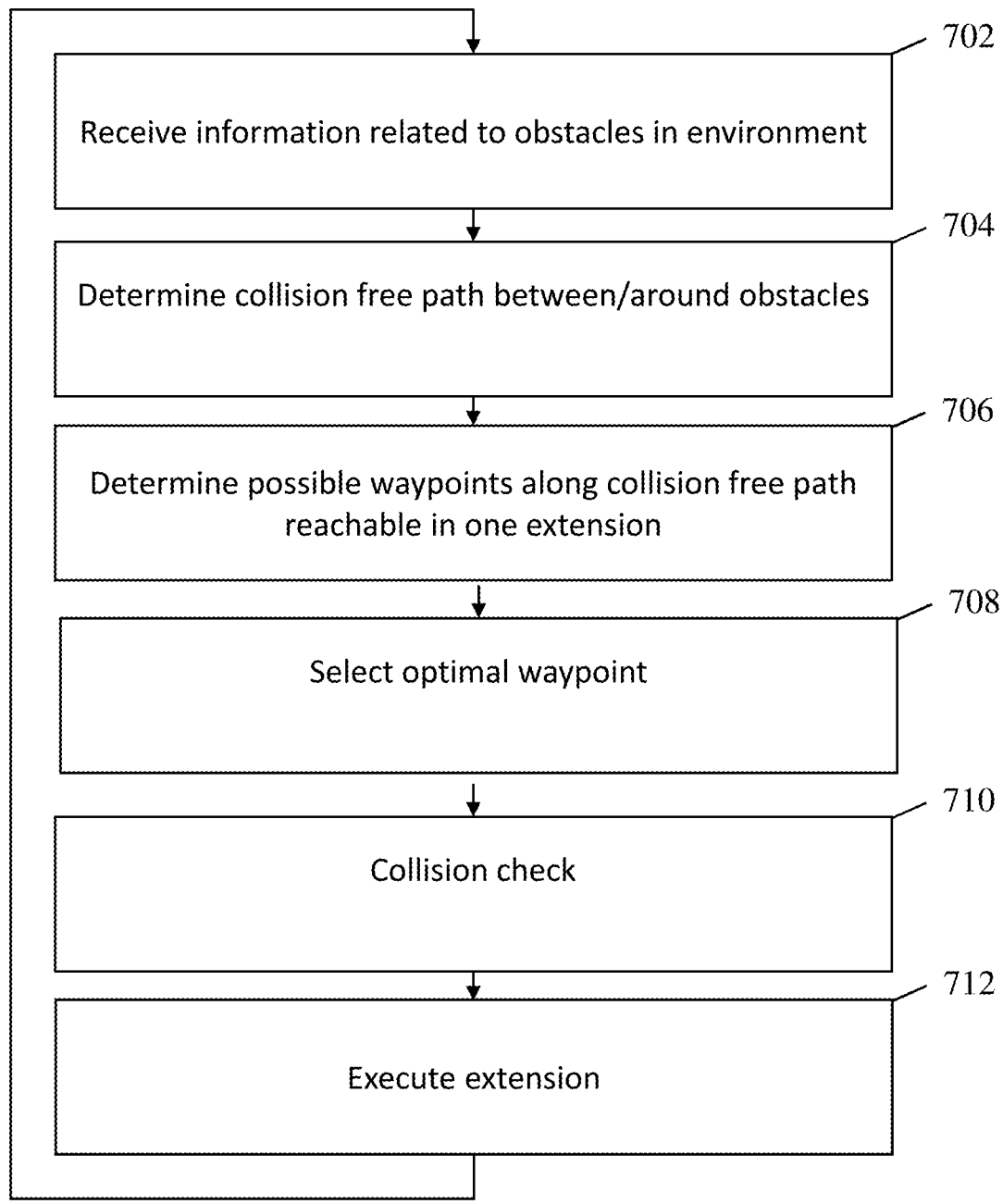
FIG. 7 is a flowchart describing the method of FIG. 6.

FIG. 7 shows a flowchart of one exemplary embodiment for determining and executing possible displacements of a robotic arm along a collision free path. Beginning with block 702, first the robotic arm receives information related to obstacles in an environment either from a preloaded model of the environment and/or from sensors configured to detect collision-free space and obstacles proximate at least a distal end of the robotic arm. A controller of the robotic arm may then use this information related to relevant obstacles proximate the robotic arm to determine a collision free path at 704, which may be a centerline through the obstacles. With a collision free path determined, at 706, the device may determine possible waypoints along the collision free path that can be reached with a single extension of an expandable segment of the robotic arm. Turning to block 708, an optimal waypoint may be selected from the set of candidate waypoints. Again this may be done using a binary search or other appropriate optimization technique. As seen in block 710, in some embodiments, before actuating an expandable segment of the robotic arm, a controller of the robotic arm may perform collision checks to ensure that the proposed displacement would not cause the robotic arm to collide with itself, and then assuming no issues are identified, the controller may then actuate the expandable segment to provide the desired extension and/or tilt at 712. It should be understood that while this information is presented as a sequence, the sequence is presented largely for ease of understanding. Calculation based steps can be performed simultaneously depending on the embodiment.

Figure 8:
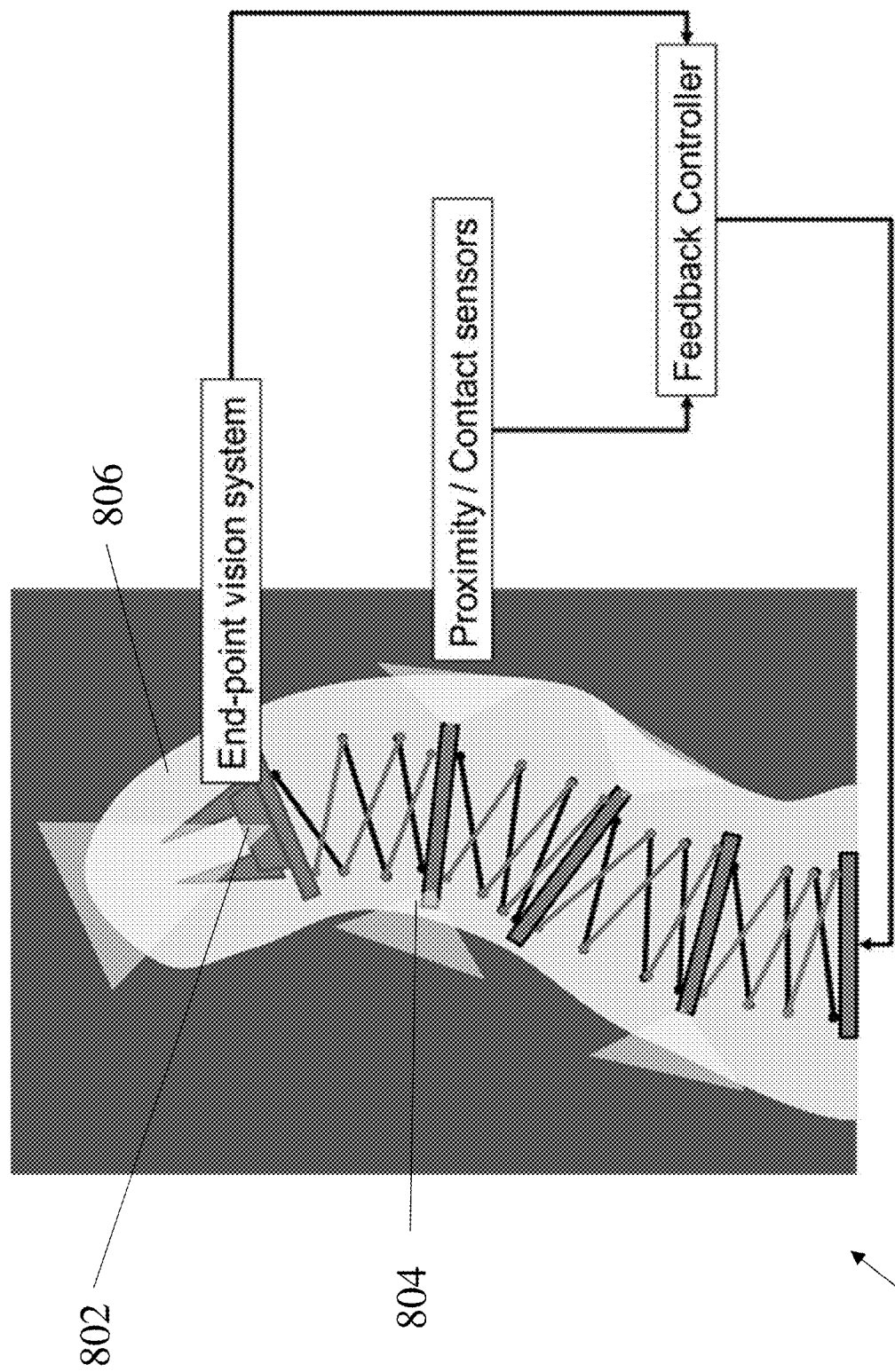
FIG. 8 is a schematic view of a robotic arm according to one embodiment sensing its way through a representative passage using a feedback control system.

FIG. 8 shows an embodiment of a robotic arm 800 that uses dynamic sensing of the environment to traverse obstacles, such as passages, located in the environment. Thus, the robotic arm may simultaneously localize and map the environment for control purposes rather than relying on information related to a pre-mapped environment. In this embodiment, to traverse passage 806, the robotic arm 800 may use an end-point vision system 802 comprising one or more optical sensors, proximity sensors, related radar or LIDAR systems, or other appropriate detector located in or near the end-effector at the distal end of the device. This detector may actively gather information about where the device is relative to obstacles in the environment. While the end-point vision system may detect longitudinal and radial position obstacle information, a series of proximity and/or contact sensors 804 positioned on the sides of one or more individual expandable segments of the robotic arm may detect a radial distance and/or contact between the robotic arm and obstacles disposed radially around the robotic arm. The side proximity sensors associated with individual expandable segments may beneficially provide feedback for that segment as well as for the device as a whole for controlling the radial positioning of the robotic arm. The longitudinal and radial position information related to the relative positioning of the robotic arm and the one or more obstacles in an environment may be fed into a feedback controller. The controller may then actively control the tilt and extension of a proximal most unactuated segment in order to avoid the obstacles detected by the end-point vision system 802 and the proximity and/or contact sensors 804. Thus, the robotic arm may still implement a sequential expansion of the robotic arm from a proximal most segment to a distal most segment of the robotic arm.

In some embodiments, the end-point vision system and side proximity sensor data could also be actively used to make corrections to expandable segments that have already been expanded. For example, for a variety of reasons including taking on a payload, external forces, increased torques being applied due to extension of the robotic arm, and/or environmental shifting, the positioning of the already expanded segments of a robotic arm could become suboptimal over the course of use. In these embodiments, the device could use feedback from the aforementioned sensors to correct the tilt and extension of previously expanded expandable segments to maintain the individual expandable segments in a desired position. In one such embodiment, the feedback controller may also be used to control the radial positioning of already extended segments relative to a desired collision free path. For instance, the environmental information input into the feedback controller may be used to actively maintain an average and/or absolute position of the individual expandable segments relative to a determined collision free path to be less than a permitted deviation threshold from the collision free path. This type of control strategy may thus help avoid collisions between already deployed segments of a robotic arm and obstacles in the environment during subsequent extensions of the robotic arm.

Figure 9:
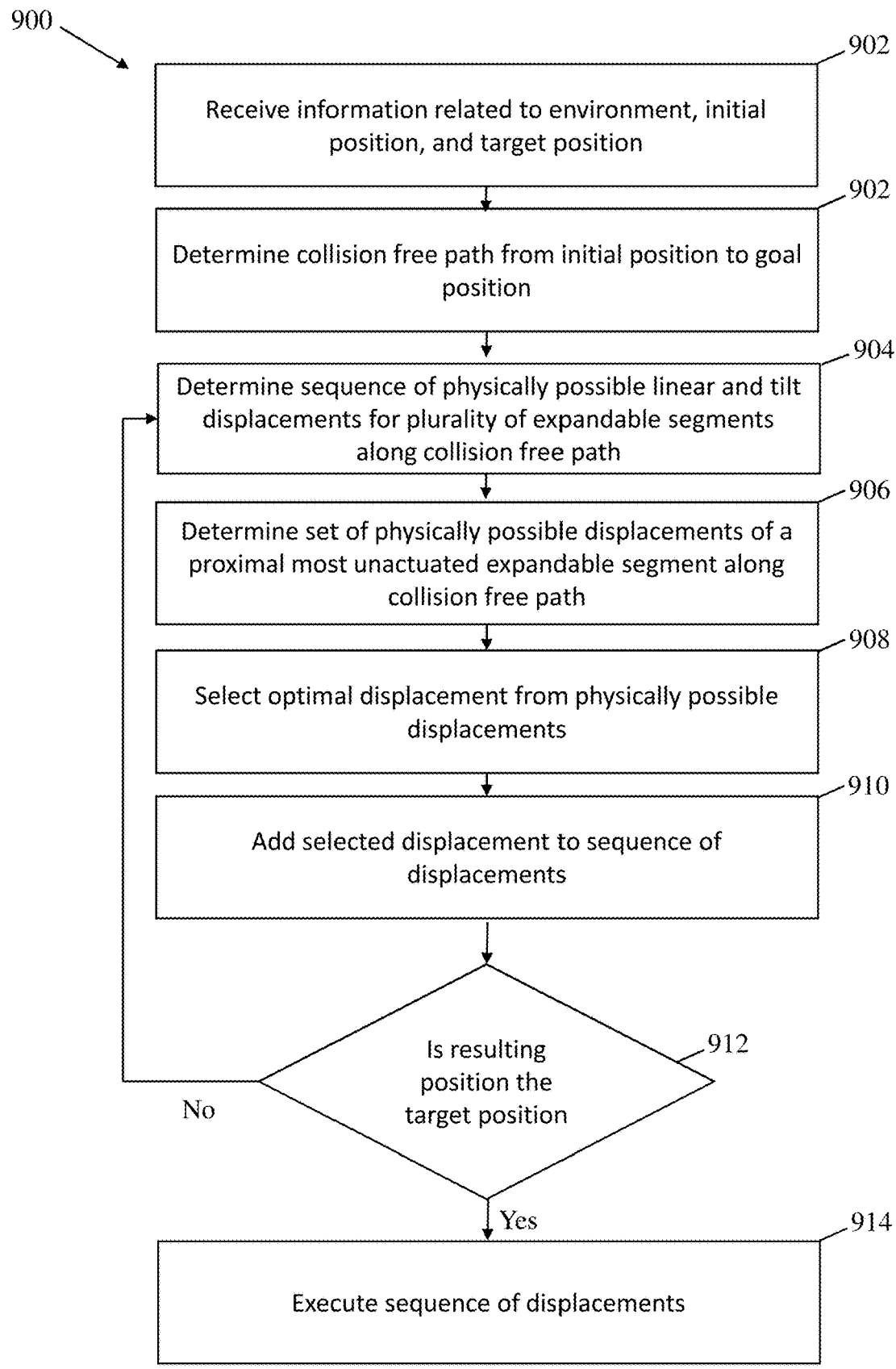
FIG. 9 is a flowchart describing a method of operating a robotic arm.

FIG. 9 presents a flow chart of one embodiment for a method 900 of determining and executing a sequence of displacements to move a robotic arm from a first initial position and orientation to a second target position and orientation. Beginning with block 902, a controller of a robotic arm may begin by receiving information related to an environment, including any obstacles contained therein, as well as the initial and target positions of the robotic arm. The controller may then determine a collision-free path from its beginning initial position to its target position using longitudinal and radial position information related to the obstacles in the environment. This may either be from pre-mapped information and/or detectors as previously described. This may include calculating a centerline between two or more obstacles within the environment as well. Turning to block 904, the controller then determines a sequence of physically possible linear and tilt displacements for the plurality of expandable segments of the robotic arm along the collision-free path. Since this involves planning an overall sequence for a device that moves by sequentially expanding individual expandable segments from the proximal end of the device to the distal end of the device, this process may be done iteratively for each expandable segment to be actuated during a desired movement of a robotic arm. For example, blocks 906, 908, and 910 are directed to determining the displacements to one or more waypoints for each of the expandable segments to create a sequence of displacements for the overall robotic arm. Specifically, at block 906 a set of physically possible displacements of a proximal most unactuated expandable segment along a collision-free path may be determined as previously described. An optimal displacement of the individual segment may then be selected from the set of possible displacements using any appropriate optimization procedure at 908. As previously described, this may correspond to a maximum possible displacement of the individual segment that does not result in a collision with one or more obstacles in the environment. The selected displacement and/or waypoint may then be added to the sequence of displacements at 910 prior to checking if the final target position and orientation has been reached at 912. Assuming the target position has not been reached, the controller may then iteratively determine, select, and add subsequent intermediate positions to the sequence of displacements until the target position is reached. After finalizing the sequence of displacements, the robotic arm may then execute the sequence of displacements at block 914.

Example: Robotic Arm

Figure 10C:
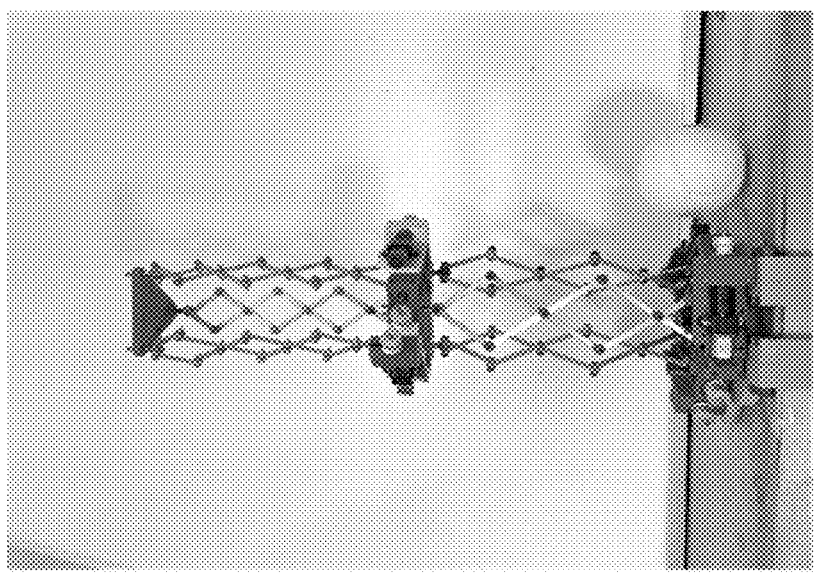
FIG. 10C is the prototype of the robotic arm of FIG. 10A, fully extended.
Figure 10B:
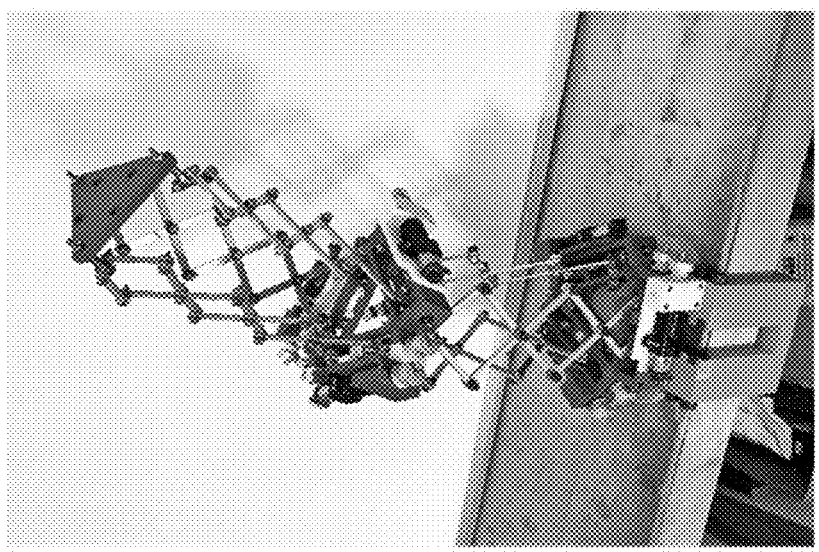
FIG. 10B is the prototype of the robotic arm of FIG. 10A, partially tilted.
Figure 10A:
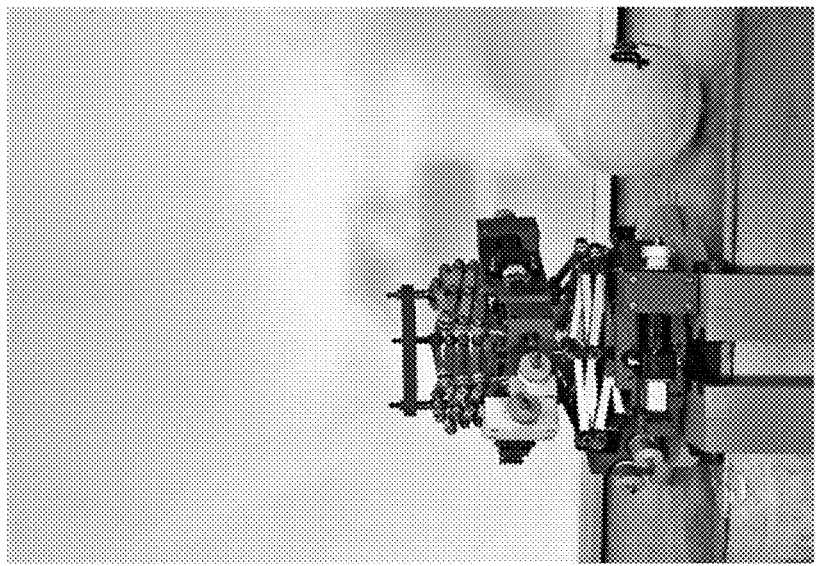
FIG. 10A is a prototype of the robotic arm according to one embodiment, fully retracted.

FIGS. 10A through 10C shows a robotic arm according to one embodiment. The depicted robotic arm includes two expandable segments where each segment includes three separate scissor lifts connecting a base plate and a distal plate of each segment. FIG. 10A shows the robotic arm in the fully retracted state. FIG. 10B shows the robotic arm in an extended state with the distal expandable segment tilted relative to the proximal expandable segment. In contrast, FIG. 10C shows the same expandable segments in a straight expanded state. Thus, the robotic arm is capable of altering both the axial displacement and tilt of the segments by controlling the relative extension of three separate linear actuators, which in this case are scissor lifts, attached between the plates of each expandable segment. The scissor lifts may be individually controlled by operatively coupled individual drivers in some embodiments.

FIGS. 11A-11B show one possible embodiment of a driver that was used with the robotic limb of FIGS. 10A-10C. The driver may include a motor 1106, which is coupled to a first shaft 1102 via any appropriate coupling 1104. As the motor rotates shaft 1102, pulleys 1108 at the end of shaft 1102 also rotate, driving second threaded shaft 1106 which includes two oppositely directed threaded sections 1104 with two lead nuts 1102 threaded thereon. This rotation causes the lead nuts 1102 to move towards or away from each other depending on the direction of rotation. As the lead nuts are moved towards each other, they may push the proximal most linkages of an associated scissor lift towards each other, causing the scissor lift to extend. Similarly, when the motor is driven in reverse the lead nuts separate retracting the scissor lift. However, while a particular type of actuator have been depicted other forms of actuators may be used as previously described.

Figure 12C:
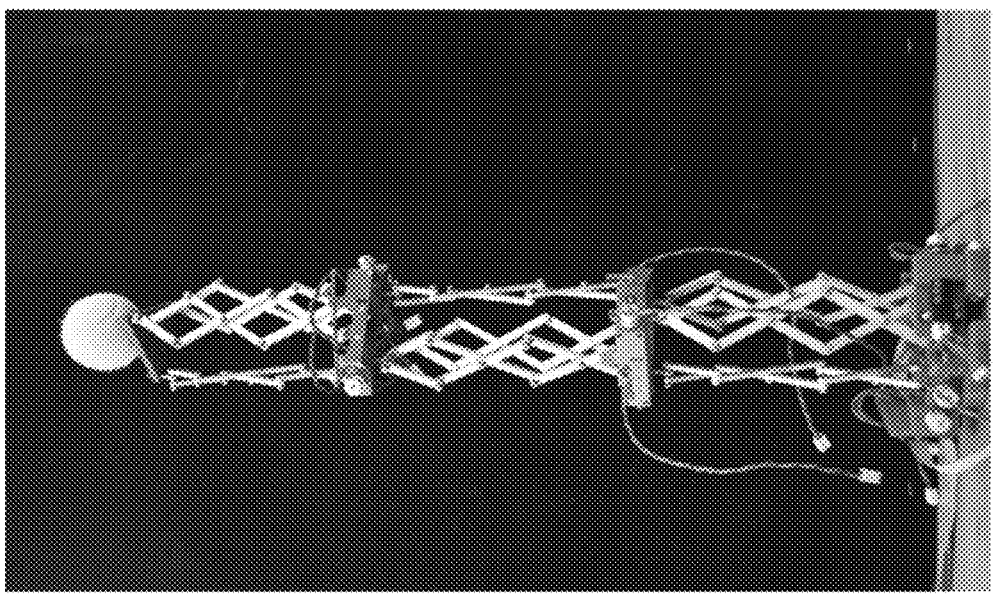
FIG. 12C is the robotic arm of FIG. 12A, fully extended.
Figure 12B:
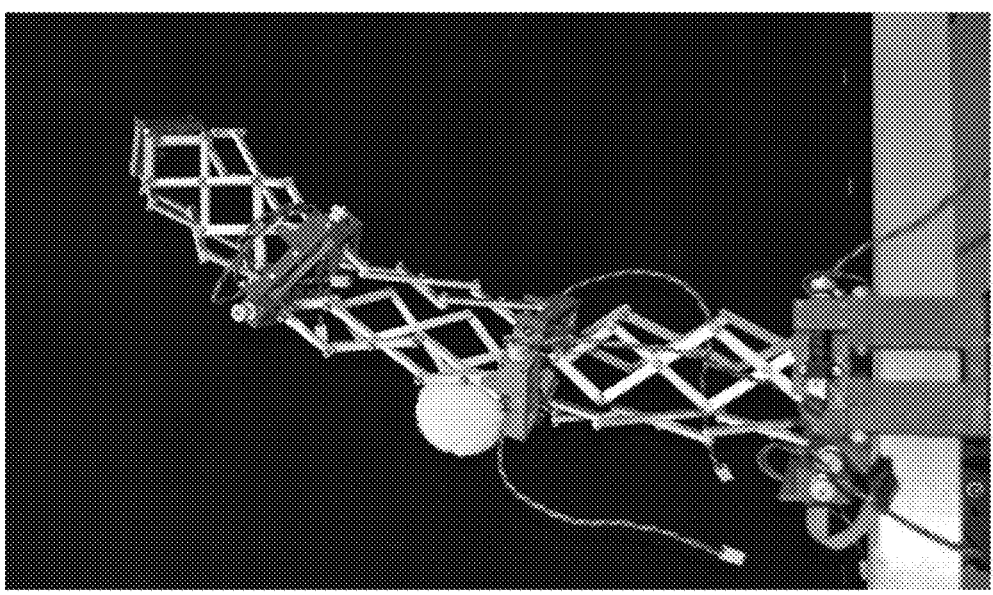
FIG. 12B is the robotic arm of FIG. 12A, partially tilted.
Figure 12A:
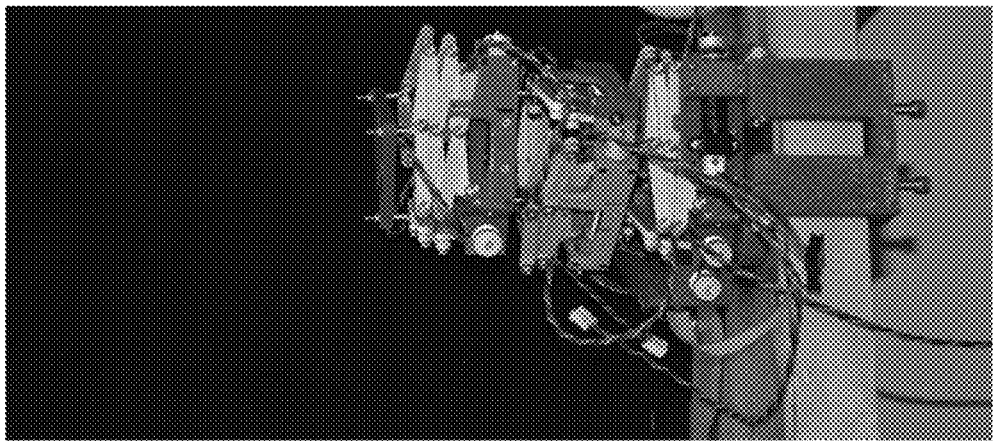
FIG. 12A is a robotic arm according to one embodiment, fully retracted.

FIGS. 12A-12C illustrate a similar robotic arm as that described above relative to FIGS. 10A-11B. In the figures, the robotic arm includes three expandable segments which are moved from a fully retracted state in FIG. 12A to a tilted and expanded state in FIG. 12B and a straight expanded state in FIG. 12C while holding a payload.

Example: Scissor Lift Construction

In some embodiments, as illustrated schematically in FIG. 14, scissor lift actuators may include elongate sections 1402 at their lower ends. When a scissor lift is fully retracted as seen in FIG. 14, the scissor lift functionally becomes singular, meaning that applying force at point B would not generate significant upward force. Therefore, adding elongate sections 1402 that extend in a direction that is angled, and in some embodiments perpendicular, relative to a proximal portion of a proximal most linkage of a scissor lift in the retracted position which may counter this singularity. In some embodiments, the drivers pinch the scissor lifts at the elongate axially extending sections like those illustrated in FIG. 14. In other embodiments, the scissor lift may be mechanically prevented from retracting all the way to avoid such a singularity.

Example: Analysis of Robotic Arm

An expandable arm may meet a set of kinematic, structural, and geometric design criteria to enable the sequential expansion algorithm and successfully access confined spaces within selected environments. Functional requirements and metrics for design evaluation in some embodiments may include the following considerations:

The arm may be composed of several segments stacked in sequence. Each segment may be capable of three-degrees of freedom motion including extension, and two-degrees of freedom in tilt.

To allow high positioning accuracy the structure may have high axial, torsional, and bending stiffness.

The arm may be of low profile when fully contracted, while the body may be expanded to reach a point deep in a confined area. The ratio of the fully expanded body length to the fully contracted body length, termed expansion ratio, is the figure of merit for this criteria.

The cross-sectional area of the arm may be small relative to the fully extended length of the structure to minimize possible interference with the environment. To evaluate the slenderness of the arm, the ratio of the maximum diameter of the cross-sectional area to the maximum length of the structure may be used.

For this example, a structure belonging to the family of zero-torsion parallel mechanisms for each of the arm segments including a prismatic and two degrees of rotational freedom were selected. This family of mechanisms is characterized by a mobile platform that is connected to three legs via spherical joints. These legs constrain the spherical joints to move within three equally spaced vertical planes that intersect along a common line.

Figure 13:
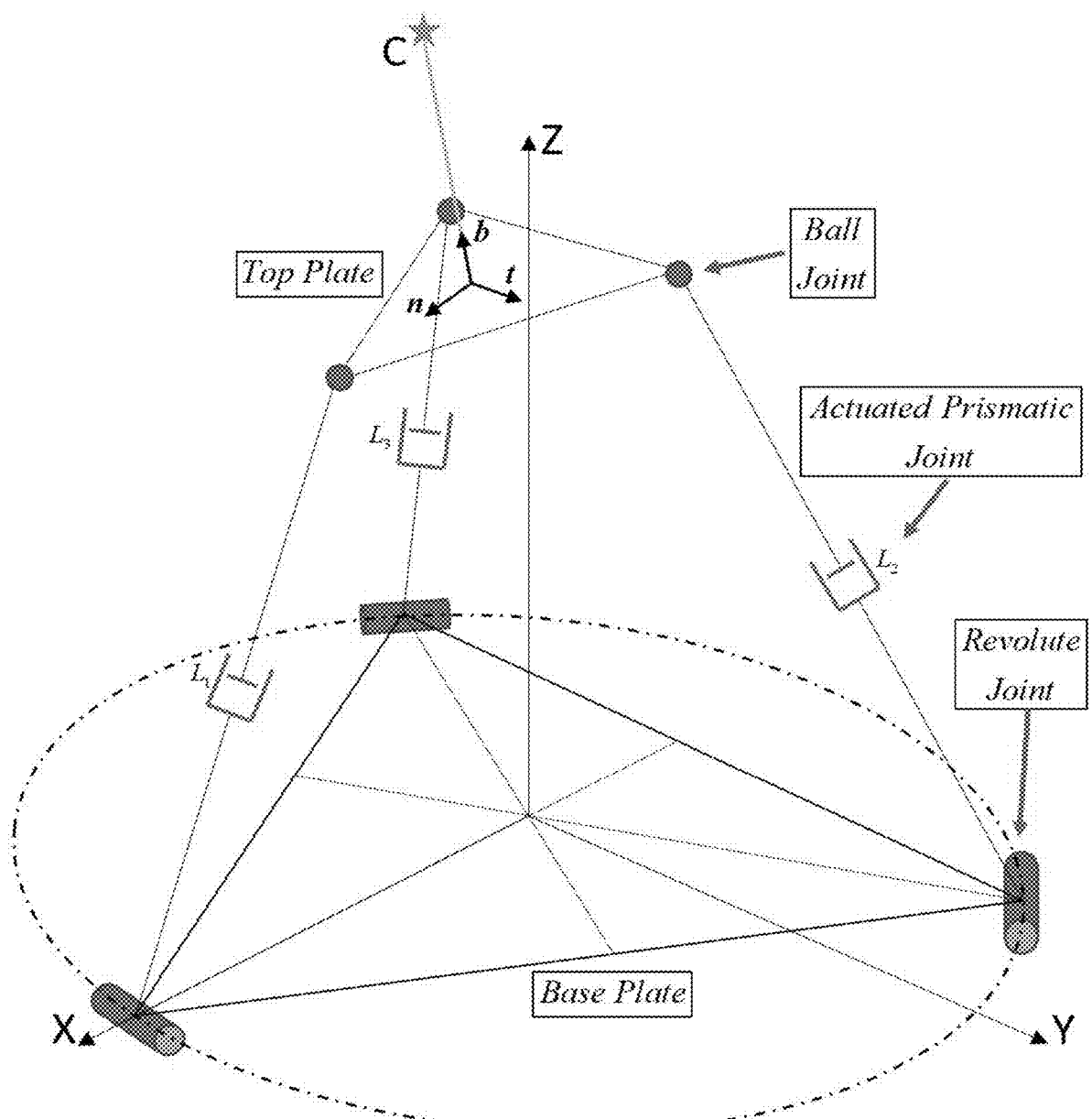
FIG. 13 is a kinematic structure of a single segment of the robotic arm according to one embodiment consisting of three prismatic joints.

FIG. 13 shows the basic kinematic structure of a single segment of the expandable arm. The top and bottom plates are connected with three prismatic joints driven by independent actuators. The top end of each prismatic joint is a spherical joint. The bottom end of the prismatic joint is a revolute joint. When the three prismatic joints lengthen an equal distance, the top plate is lifted and the structure elongates. A difference in length among the three prismatic joints causes the top plate to rotate or tilt about any axis perpendicular to vertical.

One of the major problems with scissor mechanisms is singularity. As shown in FIG. 14C, the scissor mechanism becomes singular when it is completely contracted. Thus, a horizontal force applied to the end of the bottom link, point B, does not generate an upward motion at this singular configuration. However, this singularity can be eliminated by extending the bottom end in a direction perpendicular to the bottom link; a horizontal force applied to point A can generate a moment about point D with a moment arm $l_b$. In the analyzed design, a linear actuator is connected to point A to get rid of the singularity problem.

To begin the desired analysis, the determination of the relationship between scissor linkage height, and the actuator displacement for a single scissor mechanism may be determined. This is a planar linkage system, as shown in FIG. 13. Let L be the height of the scissor and w be the distance between end points of base scissor links, which is varied by an actuator.

A salient feature of this scissor mechanism is the offset in each of the lowest linkages. The length of the offset is denoted $l_b$ in FIGS. 14A-14C. The singularity that occurs at the completely contracted configuration can be eliminated, and the peak motor torque, which is applied at the contracted configurations, may be reduced by using this offset, at the cost of complicating the scissor linkage kinematics.

Since all links are kept parallel, the height of the scissor linkage is given by $$L = l_e \sin\theta + l_b \cos\theta \qquad (1)$$

where $l_e$ is the constant length of line BC and $\theta$ is the inclination angle of $l_e$ to the horizontal. The width of the scissor linkage is similarly related to another non-material line, AD with length $l_p$ as follows, $$w = 2l_o \cos\theta - l_b \sin\theta \qquad (2)$$

From (1) and (2) the following can be found $$\cos\theta = \frac{Ll_b + \frac{w}{2}l_e}{l_b^2 + l_o + l_e} \quad \sin\theta = \frac{Ll_o + \frac{w}{2}l_b}{l_e l_o + l_b^2} \qquad (3)$$

Using the trigonometric identity $\sin^2\theta + \cos^2\theta = 1$, we can obtain $$w = \frac{2}{l_b^2 + l_e^2}\left[(l_b^2 + l_o l_e)\sqrt{l_b^2 + l_e^2 - L^2} - Ll_b(l_e - l_o)\right] \qquad (4)$$

Using these kinematic relationships, the actuator force F for generating a force Mg, or bearing a load −Mg, at the tip of the scissor mechanism can be found. Assuming that the mechanism is friction-less and mass-less, the virtual work done by the actuator force and the external force is given by $$\delta\text{Work} = F\delta w - Mg\delta L \qquad (5)$$

From (1) and (2), $$\delta L = (l_e \cos\theta - l_b \sin\theta)\delta\theta$$

$$\delta w = -2(l_o \sin\theta + l_b \cos\theta)\delta\theta \qquad (6)$$

Substituting (6) into (5), the virtual work vanishes for an arbitrary $\delta\theta$ when, $$F = \frac{Mg(l_e \cos\theta - l_b \sin\theta)}{2(l_o \sin\theta + l_b \cos\theta)} \qquad (7)$$

Note that for $0 \le \theta < \pi/2$ the denominator is non-zero. Therefore, the actuator force F is finite, and the singularity is eliminated with the offset $l_b > 0$. Note also that (7) is a monotonically decreasing function of $\theta$. Therefore, the largest actuator force is found when $\theta = 0$, which is the worst case.

$$F_{max} = Mg\frac{l_e}{2l_b} \tag{8}$$

Using the above, as the offset $l_b$ increases the peak force is reduced.

Although the zero-torsion parallel mechanism is able to produce the desired motion for a single segment of the expandable arm, there is significant coupling between tilting motions and xy-translation. Tilting the top plate inevitably induces a sideway displacement. Specifically, the magnitude of the sideways, parasitic translation, here denoted r, was entirely depended upon the angle of tilt of the top plate, $\gamma$, $$r = \tfrac{1}{2} R_t (1 - \cos \gamma) \tag{9}$$

where $R_t$ is the radius of the circumcircle defined by the vertices, $E_i, i \in [1, 2, 3]$.

The parasitic motion may be accounted for in a motion planning algorithm in order to avoid additive positioning error of the end point. The following analysis evaluates the sideway deflection in relation to the top plate tilting angle, and a series of segment configurations are found which are modified by taking into account the sideway deflection. First, a single scissor mechanism is analyzed to find the functional relationship between the top plate tilting angle and the parasitic translation, to then obtain the modified segment configuration to compensate for the sideway deviation for the series of segments.

Figure 15:
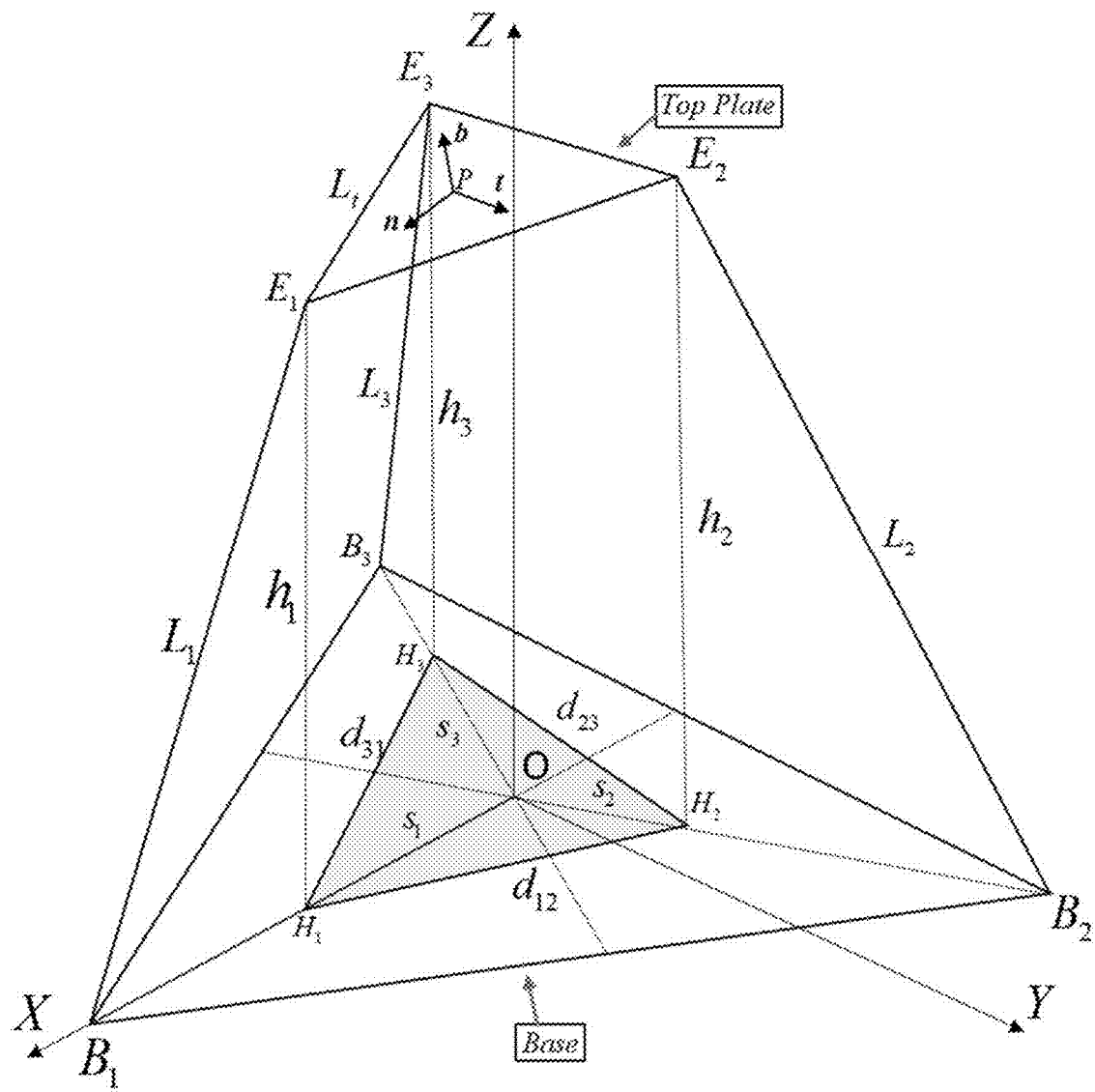
FIG. 15 is a coordinate diagram used to characterize the kinematics of a single expandable segment according to one embodiment of a robotic arm.

The coordinate frame of the top plate of a single segment of the device is shown in FIG. 15. The top plate position is given by $P: p = [x, y, z]^T$ in the O reference frame. The orientation of the top plate is captured in the unit vectors, n, t, and b. As noted in the previous chapter, the orientation of the top plate is coupled with translational motion along the X and Y axes. Thus, the unit vectors, n, t, and b can be expressed as functions of x and y. The goal for this section is to relate height of the three scissor linkages, $L_i$ to end effector position, P.

To simplify the following analysis, a set of intermediate variables is introduced. $S_i$ is the distance between the origin, O, and point $H_i$, the projection of the top plate vertex, $E_i$, onto the base plate. Here the index, $i \in (1, 2, 3)$, any of the three vertices of the base plate. hi is the distance between $H_i$ and $E_i$. $d_{ij}$ is the length of the projection of the top plate onto the base. Lastly, let $s_0$ be a constant characteristic length of the triangle defined as the distance from the center, O to any of the base vertices, $B_i$. From these definitions, it follows that each scissor length, is given by, $$L_i = \sqrt{(s_o - s_i)^2 + h_i^2} \tag{10}$$

A relationship between the internal variables and position coordinates of the top plate may now be found. Consider, $\Delta H_1 O H_2$ in FIG. 15. Note, $H_1 O H_2 = \tfrac{2}{3}\pi$ since O is located at the center of the base. From the law of cosines it follows that, $$d_{12}^2 = s_1^2 s_2^2 s_1 s_2 \tag{11}$$

The projected dimension, $d_{12}$, can be related to the top plate via the following equation:

$$d_{12}^2 + (h_2 - h_1)^2 = L_t^2 \tag{12}$$

Substituting (11) into (12) gives the first of three kinematic constraint equations, $$s_1^2 + s_2^2 + s_1 s_2 + (h_2 - h_1)^2 = L_t^2 \tag{13}$$

Two additional constraint equations are found by following the same procedure, $$s_1^2 + s_3^2 + s_1 s_3 + (h_3 - h_1)^2 = L_t^2$$

$$s_3^2 + s_2^2 + s_3 s_2 + (h_2 - h_3)^2 = L_t^2. \tag{14}$$

The coordinates of the vertices, $E_1$, $E_2$, and $E_3$, are expressed in terms of the internal variables:

$$E_1: e_1 = [\, s_1 \quad 0 \quad h_1 \,]^T \tag{15}$$

$$E_2: e_2 = \left[\, -s_2 \sin\tfrac{\pi}{6} \quad s_2 \cos\tfrac{\pi}{6} \quad h_2 \,\right]^T$$

$$E_3: e_3 = \left[\, -s_3 \sin\tfrac{\pi}{6} \quad -s_3 \cos\tfrac{\pi}{6} \quad h_3 \,\right]^T$$

Taking the algebraic sum of the vertices of the top plate relates the end effector position, $P: p = [x, y, z]^T$, to the internal variables as follows:

$$x = \frac{1}{3}\left(s_1 - \frac{(s_2 + s_3)}{2}\right) \tag{16}$$

$$y = \frac{\sqrt{3}}{6}(s_2 - s_3)$$

$$z = \frac{1}{3}(h_1 + h_2 + h_3)$$

Solving (13), (14), and (16) simultaneously for $s_i$ and $h_i$, $i \in (1, 2, 3)$ then substituting into (10) gives the following expressions for each of the three scissor lengths:

$$L_1 = \sqrt{\left(-\frac{L_t}{\sqrt{3}} + r + s_o - 2x\right)^2 + \left(\sqrt{\tfrac{2}{3}(\sqrt{3} L_t + 3x)(r-x) - 2y^2} - z\right)^2} \tag{17}$$

$$L_2 = \sqrt{\left(-\frac{L_t + 3y}{\sqrt{3}} + r + s_o - x\right)^2 + \frac{(-3rT_2 - 3T_2 x + \sqrt{6}\, T_1 y + 6yz)^2}{36 y^2}} \tag{18}$$

$$L_3 = \sqrt{\left(-\frac{L_t + 3y}{\sqrt{3}} + r + s_o - x\right)^2 + \frac{(3rT_2 + 3T_2 x + \sqrt{6}\, T_1 y + 6yz)^2}{36 y^2}} \tag{19}$$

where, $$r = \sqrt{x^2 + y^2} \tag{20}$$

$$T_1 = \sqrt{(\sqrt{3} L_t + 3x)(r - x) - 3y^2} \tag{21}$$

$$T_2 = \sqrt{2(\sqrt{3} L_t + 3x)(r - x) - 6y^2} \tag{22}$$

(17), (18), and (19) can each be substituted in to (4) to give the full inverse kinematics for a segment of the expansion arm.

The final kinematic expression used for implementing the Sequential Expansion Algorithm is the normal vector, b of the top plate as a function of top plate position, $p = [x, y, z]$.

First expressions for the coordinates of the spherical joints, $E_1$, $E_2$, and $E_3$, are obtained in terms of the top plate position, P, by substituting our expressions for the internal variables found above into (15).

Next the unit vectors, n and t, may be expressed as functions of the coordinates of the vertices, $E_1$, $E_2$, and $E_3$:

$$n = \frac{1}{L_{tv}}(e_1 - p) \quad (23)$$

$$t = \frac{1}{L_t}(e_2 - e_3)$$

In (23), $L_{tv}$ represents the radius of the circumcircle of triangle composed of the vertices, $E_i$, $i \in [1; 3]$.

Let the components of b be denoted $[b_x, b_y, b_z]$. b is defined by the cross product, n×t. This operation gives the following expressions for the components of b as functions of the top plate position, P:

$$b_X = \frac{\sqrt{2(\sqrt{3} L_t + 3x)(r - x) - 6y^2}}{L_t^2} \quad (24)$$

$$b_Y = \frac{(r + x)\sqrt{2(\sqrt{3} L_t + 3x)(r - x) - 6y^2}}{L_t y} \quad (25)$$

$$b_Z = \frac{L_t - 2\sqrt{3}\, r}{L_t} \quad (26)$$

To assure that the next waypoint is reached, b should point toward the waypoint so the point can be reached via a pure elongation. The coordinates of the next waypoint, C may be expressed as follows:

$$\text{Point } C: \begin{bmatrix} C_x \\ C_y \\ C_z \end{bmatrix} = \begin{bmatrix} x + k b_x \\ y + k b_y \\ z + k b_z \end{bmatrix} \quad (27)$$

where k is the distance between points P and B. Note that the coordinates of point C are known. Also note that the height of the segment being considered is specified: $z = z^*$. Then substituting for the axial extension, $z^* = OA$, for z, and $b_z$ from (26):

$$k = \frac{C_z - z^*}{1 - 2\sqrt{3}\, r/L_t} \quad (28)$$

Substituting (24), (25) and (28) into (27) two conditions on x and y can be obtained:

$$C_x = x + \frac{(C_z - z^*)\left(\sqrt{2(\sqrt{3} L_t + 3x)(r - x) - 6y^2}\right)}{(1 - 2\sqrt{3}\, r/L_t) L_t^2} \quad (29)$$

$$C_y = y + \frac{(C_z - z^*)(r + x)\sqrt{2(\sqrt{3} L_t + 3x)(r - x) - 6y^2}}{(1 - 2\sqrt{3}\, r/L_t) L_t y}$$

Solving (29) gives the position, p* where the proximal unextended stage may reach C when extended distance k.

Due to the highly non-linear nature of these coupled equations, obtaining a closed form solution is not tractable. This problem can, however, be reformulated and solved by using a simple recursive formula. The cost function, defined in (30), may be used to quantify the alignment of the unit vector b given by (24), (25) and (26) the unit vector pointing in the direction of Point C from the current position of point P, as given by (31) below.

$$J = b^T T \quad (30)$$

where, $$T = \frac{C - p}{\|C - p\|} \quad (31)$$

The optimal position for the segment may be given by:

$$p^* = \arg \min_p (J) \quad (32)$$

This optimization may be solved in real time using gradient descent. The output of the optimization may be inserted into the constraint equations, (29) to verify the validity of the solutions.

Example: Experimental Validation

A prototype of the current device was built to validate the proposed design concepts and control algorithms. The initial prototype is pictured in FIGS. 12A-12C. Each segment was extendable to a maximum height of 240 mm with an extension ratio of 5.3. The prototype weighed 560 grams. The effective diameter, measured by the largest circumcircle of the robot, excluding electronics, was 55 mm. This gave a slenderness ratio of 1.5 per stage. The maximum tilt angle of a single stage was 75 degrees when tilting about an arbitrary axis perpendicular to Z. This metric was determined using the singularity analysis presented above.

The actuator assembly used to control the individual scissor mechanisms is shown in FIGS. 11A-11B. The height of each scissor mechanism was controlled by a single actuator. It featured a bi-directional lead screw and two lead nuts. The opposing threading of the two sides of the lead screw created symmetric linear motion between the two lead nuts. The distance between the two lead nuts controlled the extension of a single scissor linkage.

The base of a single segment without the scissor linkage is depicted in FIG. 11A. The triangular shape and vertical side walls add stiffness in both radial and axial directions. This component was hollow down the center to minimize weight and allow central wiring for motor control and sensor integration.

The cutout in each of the three side walls acted as a compact linear guide for the lead nuts in the actuator assembly. The linear guide was preloaded in rotation along the axis of travel to prevent backlash with a set of cantilever beams protruding from the lead nuts.

The top plate, base frame, and lead nuts were all 3D printed on a Stratasys Dimension 1200es printer using ABS. The scissor linkages were waterjet cut from 6061 aluminum.

The motion controller for this system was implemented on an Arduino Mega using Cytron Dual Channel Motor Drivers and a 15V switching power source. Each DC motor drove a lead screw assembly via the timing belt and pulley system depicted in FIG. 11B. The motor encoders were calibrated at the start of each new trail via optical limit switches.

Simple PID control was implemented on each of the scissor mechanism. The Z-axis positioning accuracy of a single segment was 80 microns in repeatability. The axial stiffness of a segment of the prototype was 57 N/mm. Displacement was measured over 30 trials for both repeatability and stiffness using an SPI dial gauge with 10 micron graduations. During stiffness testing, a single segment was loaded with 500, 700, and 900 gram sample masses along the Z-axis while measuring displacement with the SPI dial gauge.

Figure 16:
FIG. 16A is a front, left side view of a robotic arm reaching through a simulated narrow passage.
FIG. 16B is a front, right side view of the robotic arm of FIG. 16A reaching through the simulated narrow passage.
Figure 17:
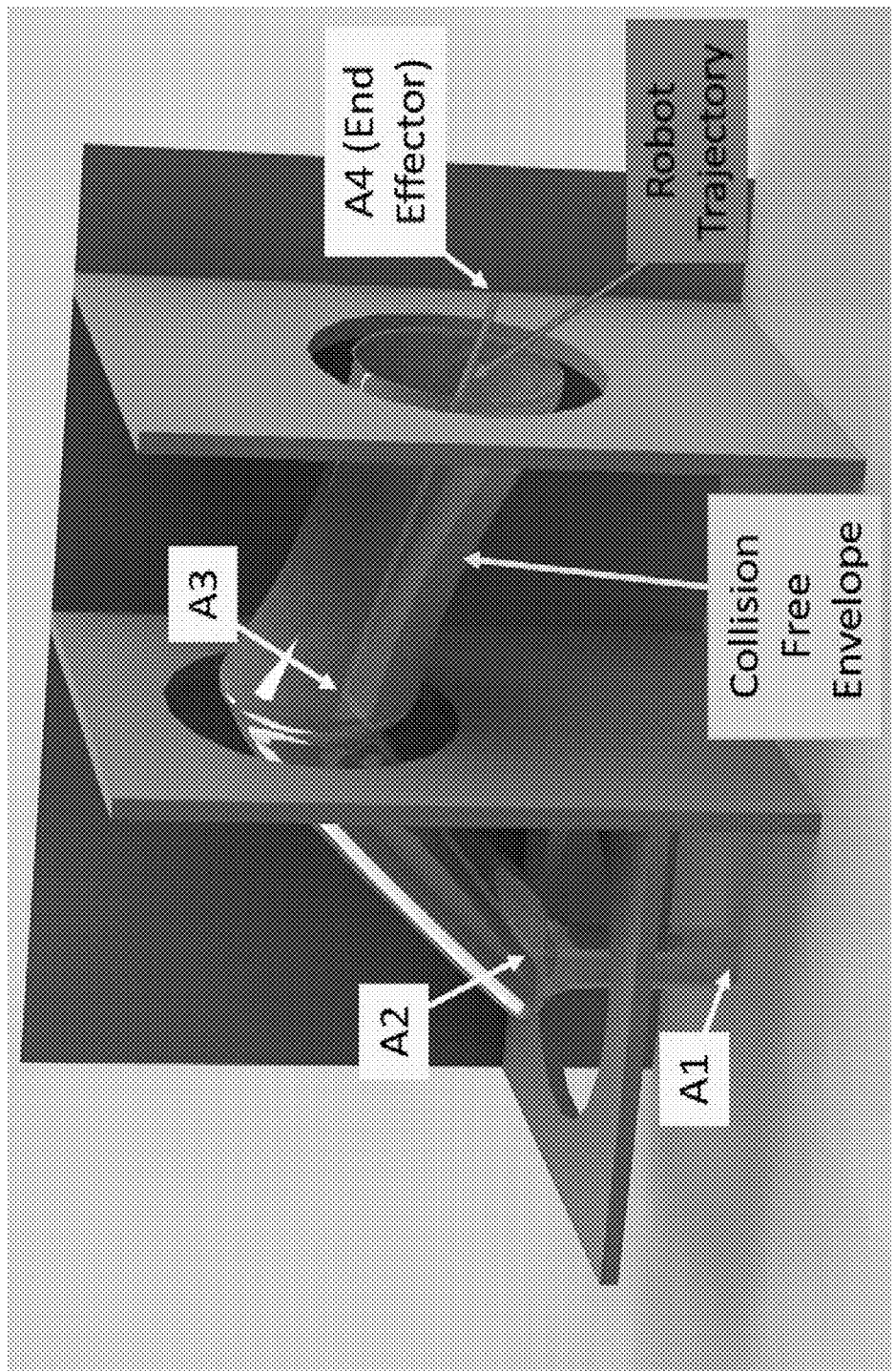
FIG. 17 is a simulated narrow passage used in experimentation.

FIGS. 16A and 16B shows an experiment of the prototype device navigating through a confined space. The robot followed the trajectory generated where the coupled sideway deviation was compensated for. FIG. 17 shows process used to compute the executed sequence of displacements. The transparent tube represents the collision-free configuration space. The line passing through the tube represents the centerline of the robot where each of the vertices are a waypoint or interface between segments of the robot. The output is a list of target position vectors A1, A2, and A3 where are taken in the reference frame of each of the segments base coordinate frame, O, as depicted in FIG. 15. A set of evenly spaced points are then generated between the current position of each segment and the target position. Driving this trajectory through the inverse kinematics for each stage in sequence provides the reference to the low level motor controllers thus enabling collision free motion.

The above noted prototype and experiments verify that the disclosed robotic systems are capable of carrying an end-effector with significant payload and locate it at an arbitrary position and orientation while traversing obstacles located in a complex environment. Further, compared to pneumatically-driven soft robots, the current device achieved high stiffness and high positioning accuracy while providing this desired positioning of the robotic arm.

The above-described embodiments of the technology described herein can be implemented in any of numerous ways. For example, the embodiments may be implemented using hardware, software or a combination thereof. When implemented in software, the software code can be executed on a controller or computing device of a robotic arm which may correspond to any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user" or "operator." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A robotic arm comprising:
a plurality of expandable segments connected in series from a proximal most expandable segment to a distal most expandable segment, wherein each expandable segment of the plurality of expandable segments is individually actuatable to linearly extend and tilt a distal portion of the expandable segment; and
a processor operatively coupled to the plurality of expandable segments, wherein the processor is configured to:
determine a collision free path from a first position to a second position through an environment;
determine a sequence of physically possible linear and tilt displacements for the plurality of expandable segments from the first position towards the second position along the collision free path without contacting one or more obstacles in the environment; and
sequentially expand and/or tilt the plurality of expandable segments from the proximal most expandable segment to the distal most expandable segment.

2. The robotic arm of claim 1, wherein the processor is configured to fix a position and orientation of each expandable segment after the expandable segment is actuated.

3. The robotic arm of claim 1, wherein the plurality of expandable segments are individually actuatable to tilt the distal portion of the expandable segment in a combination of two axial directions perpendicular to the direction of linear extension.

4. The robotic arm of claim 1, wherein each expandable segment comprises at least a first linear actuator and a second linear actuator extending between a proximal portion of the expandable segment and a distal portion of the expandable segment, wherein controlling the relative extension of the first and second linear actuators controls an extension and tilt of the distal portion relative to the proximal portion of the expandable segment.

5. The robotic arm of claim 4, wherein each expandable segment further comprises a third linear actuator extending between the proximal and distal portions of the expandable segment.

6. The robotic arm of claim 5, wherein controlling the relative extension of the first, second, and third linear actuators controls the tilt of the distal portion relative to the proximal portion of the expandable segment in at least two directions.

7. A robotic arm comprising:
a plurality of expandable segments connected in series from a proximal most expandable segment to a distal most expandable segment, wherein each expandable segment of the plurality of expandable segments is individually actuatable to linearly extend and tilt a distal portion of the expandable segment;
wherein each expandable segment comprises at least a first linear actuator and a second linear actuator extending between a proximal portion of the expandable segment and a distal portion of the expandable segment, wherein controlling the relative extension of the first and second linear actuators controls an extension and tilt of the distal portion relative to the proximal portion of the expandable segment;
wherein each expandable segment further comprises a third linear actuator extending between the proximal and distal portions of the expandable segment;
wherein controlling the relative extension of the first, second, and third linear actuators controls the tilt of the distal portion relative to the proximal portion of the expandable segment in at least two directions; and
wherein a proximal end of each linear actuator is a revolute joint, and a distal end of each linear actuator is a spherical joint.

8. The robotic arm of claim 4, wherein the first and second linear actuators are scissor lifts.

9. A robotic arm comprising:
a plurality of expandable segments connected in series from a proximal most expandable segment to a distal most expandable segment, wherein each expandable segment of the plurality of expandable segments is individually actuatable to linearly extend and tilt a distal portion of the expandable segment;
wherein each expandable segment comprises at least a first linear actuator and a second linear actuator extending between a proximal portion of the expandable segment and a distal portion of the expandable segment, wherein controlling the relative extension of the first and second linear actuators controls an extension and tilt of the distal portion relative to the proximal portion of the expandable segment;
wherein the first and second linear actuators are scissor lifts; and
wherein a proximal most linkage of at least one of the scissor lifts includes an elongated section that is parallel to a longitudinal axis of the associated scissor lift when in a retracted configuration, and wherein the elongated section extends from and is angled relative to a proximal portion of the proximal most linkage.

10. The robotic arm of claim 1, wherein each expandable segment comprises at least a first linear actuator and a rotational actuator coupled to a distal end of the linear actuator.

11. The robotic arm of claim 1, wherein the robotic arm further includes an end effector coupled to the distal most expandable segment.

12. The robotic arm of claim 1, wherein an optical and/or distance detector is mounted on the distal portion of distal most segment.

13. The robotic arm of claim 1, further comprising optical and/or distance detectors mounted on individual segments to detect a radial distance to surrounding obstacles in the environment.

14. The robotic arm of claim 1, wherein the processor is further configured to detect a radial distance from one or more expandable segments of the plurality of expandable segments to one or more obstacles disposed radially around the one or more expandable segments to determine the collision free path.

15. The robotic arm of claim 1, wherein the processor is configured to determine the sequence of displacements by:
   determining a set of physically possible displacements of an individual expandable segment along the collision free path;
   selecting a displacement of the individual expandable segment according to one of the set of physically possible displacements; and
   adding the selected displacement to the sequence of displacements.

16. The robotic arm of claim 7, further comprising a processor operatively coupled to the plurality of expandable segments, wherein the processor is configured to sequentially expand and/or tilt the plurality of expandable segments from the proximal most expandable segment to the distal most expandable segment.

17. The robotic arm of claim 16, wherein the processor is configured to fix a position and orientation of each expandable segment after the expandable segment is actuated.

18. The robotic arm of claim 9, further comprising a processor operatively coupled to the plurality of expandable segments, wherein the processor is configured to sequentially expand and/or tilt the plurality of expandable segments from the proximal most expandable segment to the distal most expandable segment.

19. The robotic arm of claim 18, wherein the processor is configured to fix a position and orientation of each expandable segment after the expandable segment is actuated.

* * * * *